United States Patent [19]

Kaminski

[11] 4,429,387

[45] Jan. 31, 1984

[54] SPECIAL CHARACTER SEQUENCE DETECTION CIRCUIT ARRANGEMENT

[75] Inventor: Stanley X. Kaminski, Conshohocken, Pa.

[73] Assignee: Siemens Corporation, Iselin, N.J.

[21] Appl. No.: 346,228

[22] Filed: Feb. 5, 1982

[51] Int. Cl.³ .......................... H04J 3/12; H04Q 11/04
[52] U.S. Cl. ................................... 370/110.1; 370/58
[58] Field of Search .......................... 370/110.1, 61, 58

[56] References Cited

U.S. PATENT DOCUMENTS 4,125,745  11/1978  Steidl .............................. 370/110.1

Primary Examiner—Douglas W. Olms
Assistant Examiner—Wellington Chin
Attorney, Agent, or Firm—Karl F. Milde, Jr.; Andrew G. Rodau

[57] ABSTRACT

A special character sequence detection circuit arrangement for use with a central exchange of a time multiplex digital telecommunications system connecting data terminals evaluates an established set of data characters. This set includes special characters which, when sent out by the same data terminal repetitively and a predetermined number of times, are recognized and evaluated for triggering a corresponding control process. The circuit arrangement is provided with a random access memory having memory locations each associated with a respective one of the data terminals for storing a previous character code and a previous count number. A first read-only memory receives the currently transmitted data character and assigns an individual character code to each special character. A second read-only memory programmed to derive a validated character code and an incremented count number from a combination of this individual character code, the previous character code and the previous count number. The generated information is fed back to the random access memory. A sequence is detected in dependence upon an overflow of the maximum count number and a detect control signal is provided by the second read-only memory.

15 Claims, 12 Drawing Figures

| ADDR (HEX) | SEQUENCE COUNT PROM DATA (HEX) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 000 | 00 | 00 | 00 | 00 | 00 | FF | FF | FF | 11 | 11 | 11 | 11 | 11 | FF | FF | FF |
| 010 | 12 | 12 | 12 | 12 | 12 | FF | FF | FF | 13 | 13 | 13 | 13 | 13 | FF | FF | FF |
| 020 | 14 | 14 | 14 | 14 | 14 | FF | FF | FF | 15 | 15 | 15 | 15 | 15 | FF | FF | FF |
| 030 | 16 | 16 | 16 | 16 | 16 | FF | FF | FF | 17 | 17 | 17 | 17 | 17 | FF | FF | FF |
| 040 | 18 | 18 | 18 | 18 | 18 | FF | FF | FF | 19 | 19 | 19 | 19 | 19 | FF | FF | FF |
| 050 | 1A | 1A | 1A | 1A | 1A | FF | FF | FF | 1B | 1B | 1B | 1B | 1B | FF | FF | FF |
| 060 | 1C | 1C | 1C | 1C | 1C | FF | FF | FF | 1D | 1D | 1D | 1D | 1D | FF | FF | FF |
| 070 | 1E | 1E | 1E | 1E | 1E | FF | FF | FF | 1F | 1F | 1F | 1F | 1F | FF | FF | FF |
| 080 | 00 | 00 | 00 | 00 | 00 | FF | FF | FF | FF | 21 | 31 | 41 | 81 | FF | FF | FF |
| 090 | 12 | 12 | 12 | 12 | 12 | FF | FF | FF | 13 | 13 | 13 | 13 | 13 | FF | FF | FF |
| 0A0 | 14 | 14 | 14 | 14 | 14 | FF | FF | FF | 15 | 15 | 15 | 15 | 15 | FF | FF | FF |
| ⋮ | ⋮ | | | | ⋮ | | | | ⋮ | | | | | | | |
| 1F0 | 1E | 1E | 1E | 1E | 1E | FF | FF | FF | 1F | 1F | 1F | 1F | 1F | FF | FF | FF |
| 200 | 00 | 00 | 00 | 00 | 00 | FF | FF | FF | 11 | 11 | 11 | 11 | 11 | FF | FF | FF |
| 210 | 12 | 12 | 12 | 12 | 12 | FF | FF | FF | 13 | 13 | 13 | 13 | 13 | FF | FF | FF |
| 220 | FF | 24 | 34 | 44 | 84 | FF | FF | FF | 15 | 15 | 15 | 15 | 15 | FF | FF | FF |
| 230 | 16 | 16 | 16 | 16 | 16 | FF | FF | FF | 17 | 17 | 17 | 17 | 17 | FF | FF | FF |
| ⋮ | ⋮ | | | | ⋮ | | | | ⋮ | | | | | | | |
| 7E0 | 1C | 1C | 1C | 1C | 1C | FF | FF | FF | 1D | 1D | 1D | 1D | 1D | FF | FF | FF |
| 7F0 | 1E | 1E | 1E | 1E | 1E | FF | FF | FF | FF | 2F | 3F | 4F | 8F | FF | FF | FF |

SEQUENCE COUNT PROM

| SCAN | ADDRESS | | | DATA OUT | | | |
|---|---|---|---|---|---|---|---|
| | CODE IN | CHAR IN | COUNT IN | SEQ DET | COUNT OUT | | CODE OUT |
| | A10 A9 A8 A7 | A6 A5 A4 A3 | A2 A1 A0 | D7 | D6 D5 D4 | | D3 D2 D1 D0 |
| 1 | 0 0 0 0 | 0 0 0 1 | 0 0 0 | 0 | 0 0 0 | 1 | 0 0 0 1 |
| 2 | 0 0 0 1 | 0 0 0 1 | 0 0 1 | 0 | 0 0 1 | 0 | 0 0 0 1 |
| 3 | 0 0 0 1 | 0 0 0 1 | 0 1 0 | 0 | 0 0 1 | 1 | 0 0 0 1 |
| 4 | 0 0 0 1 | 0 0 0 1 | 0 1 1 | 0 | 0 1 0 | 0 | 0 0 0 1 |
| 5 | 0 0 0 1 | 0 0 0 1 | 1 0 0 | 1 | 0 0 0 | 0 | 0 0 0 1 |

| SCAN | HEX ADDRESS | | | HEX DATA |
|---|---|---|---|---|
| 1 | 0 | 8 | 0 | 1 1 |
| 2 | 8 | 8 | 9 | 2 1 |
| 3 | 8 | 8 | A | 3 1 |
| 4 | 8 | 8 | B | 4 1 |
| 5 | 8 | 8 | C | 8 1 |

SPECIAL CHARACTER SEQUENCE DETECTION CIRCUIT ARRANGEMENT

BACKGROUND OF THE INVENTION

The invention is related to a special character sequence detection circuit arrangement of a time-multiplex digital telecommunications system for evaluating data characters sent out by one of a multiplicity of data terminals adapted to be connected to a central exchange control of the telecommunications system and scanned cyclically. The established set of data characters includes special characters which, when sent out repetitively a predetermined number of times, are determined by the central exchange control for triggering a corresponding control process.

Fully electronic computer-controlled switching systems for handling digital communication services are wellknown in the art. Such switching systems are flexibly designed for use in different applications such as worldwide telex and gentex networks and may be used either as public or as private data networks or as integrated networks. A system of this type is described in a copending patent application, Ser. No. 199,202 filed Oct. 29, 1980, now allowed. The central exchange control of this telecommunication system is composed of modular hardware and software components. The hardware essentially comprises a central processing system which performs the main control functions, especially for establishing through-connections between pairs of data terminals and for terminating such connections. A communications hardware module connects subscriber lines or trunk lines to the central exchange control and controls time-multiplex operations during the transfer of messages between through-connected subscriber lines. It comprises a communications controller operating under program control of the central processor, terminator group controllers forming a logic interface between the communications controller and line terminators which provide the peripheral communication links to subscriber lines and trunk lines. The line terminators receive data at various speeds and in different codes and present formated data to the communications controller across an associated terminator group controller and transmit correspondingly processed output data to the associated subscribers or data terminals. The central processor system and other parts of the communications hardware, as well are duplicated in the central exchange control for reasons of reliability.

These hardware modules are supported by software modules such as an operating system and a maintenance system. A control system is the central and control-oriented part of the operating system and accomplishes central control functions. A switching system provides all functions for switching-oriented operations and controls all phases of a connection from an initial call request to final clear-down and disconnect.

Such computer-controlled switching systems are designed to be easily adjustable to different kinds of applications for use as a terminal exchange, a tandem (transit) exchange, an international gateway exchange, or a PABX for direct-connection mode. The desired flexibility requires a high level of switching capabilities for handling different kinds of high speed data traffic that is achieved by a variety of optional features.

One possibility to implement such optional features and to initiate corresponding processing routines in the central exchange control is the use of special data characters sent out by an initiating data terminal repetitively and a predetermined number of times. When received by the central exchange control the sequence of special characters is recognized and evaluated for triggering a corresponding process control. The communications controller, therefore, includes means for recognizing special characters and determining a special character sequence when the same special character occurs directly consecutively in a predetermined sequence.

A corresponding circuit arrangement is described in the U.S. Pat. No. 4,192,966. The known circuit arrangement can be used to trigger control processes only in the event that data characters consisting of an established sequence of "elements" have occurred in a likewise established frequency directly consecutively in the sequence of characters. The known circuit arrangement is provided with a memory which emits control signals to an evaluation circuit only when a received data character is composed of special sequence character elements. A counter is connected to the output of the evaluation circuit which is designed in such a manner that only by emission of the specific control signals, it is able to trigger counting processes in a counter. The counter executes a counting process only in the event that a control signal with which it has been supplied by the evaluation circuit is identical to the previously occurred control signal. If a control signal is generated which differs from the previous control signal supplied to the counter, the counter is reset to an established count.

The detection device of the known circuit arrangement is implemented in the form of a programmable read-only memory which offers the possibility to change addresses and codes for special characters, but the design evidently is aimed at only a limited use of a special character feature. The read-only memory is of limited capacity and the basic structure of the circuit arrangement requires that the special characters of a sequence are received at the evaluating memory directly consecutively. Apparently no provisions are made to correspond to the characteristic of a digital telecommunication network enabling transfer of a multiplicity of data messages simultaneously on a character-by-character basis in a time multiplex mode.

It may be envisioned that the known circuit arrangement can be integrated into the central exchange control of such a digital telecommunications system. A first possibility is to buffer all data characters transmitted from the different line terminators for several scan cycles, thereby establishing a short term history of the entire data traffic. If the characters are buffered in stacks each associated with a respective line terminator the sequences can be evaluated directly consecutively by a high speed detection circuit arrangement. Another possibility would be to provide a multiple circuit arrangement for detecting a special character sequence such that individual circuit arrangements are associated with a specific one of the data sources. If these individual circuit arrangements are triggered in synchronism with the scan cycle, they will be activated only when the associated line terminator is sending a data character. The first solution requires quite an outlay of memory space just for this special feature and would slow down the through-put rate of data. The second possibility would not be very efficient, since it necessitates an unjustified amount of hardware. Both possibilities are in contrast to the basic design of the central exchange control which provides a constantly updated version of current connection conditions and avoids buffering of data characters to be transferred whenever possible to speed up data through-put.

In addition, because of the desired flexibility of the central exchange control for different applications, the two degrees of freedom inherent to a special sequence feature should be really used. The circuit design should be such that the special characters can be sign should be such that the special characters can be reassigned easily without a hardware redesign of the circuit and the length of a sequence consisting of a plurality of data characters should be more freely selectable.

SUMMARY OF THE INVENTION

It is therefore an object of the present invention to provide an improved special character sequence detection circuit arrangement to be used with a time multiplex digital telecommunications system and being as flexibility designed as to recognize a plurality of special character sequences forming the control information for initiating respective control routines for setting up special features of the telecommunications system.

Another object of the present invention is to provide such an improved detection circuit arrangement designed to recognize a multiplicity of special sequences simultaneously in accordance with the time multiplex mode of operation of the digital telecommunications system.

A further object of the present invention is to provide such an improved detection circuit arrangement which can be programmed for detecting sequences comprising individually established numbers of characters.

Still another object of the present invention is to provide such an improved detection circuit arrangement which can be adjusted to recognize any one of the characters of the established set of characters as a special character without hardware redesign, thereby achieving a possibility for initiating custom designed optional features of the system.

Still another object of the present invention is to provide such an improved special character sequence detection circuit arrangement for use with a central exchange of a time multiplex digital telecommunications system, wherein the central exchange has a multiplicity of line terminators each adapted to be connected to a respective data terminal and central control means for controlling data transfer between cross-connected line terminators by means of store control information. In such a telecommunications system the central control means include a memory means for storing such cross-connect control information, a central timer, selecting means for generating selecting signals in the form of line terminator numbers for sequentially activating each line terminator during a scan cycle to send a data character, and a data interface unit connected to receive data character. The special character sequence detection circuit shall be arranged in the date interface unit and be designed to respond to an established set of data characters including special characters which, when sent out repetitively by the same line termintor during subsequent scan cycles and in predetermined number of times are recognized and evaluated by the central exchange control for triggering a corresponding control process.

These objects, as other objects which will become apparent from the description which follows, are achieved according to the present invention by a random access memory having address inputs, data inputs, data outputs and a multiplicity of memory locations, each associated with a respective one of the line terminators.

The address inputs are connected to receive the currently generated line terminator number for selecting a memory location in synchronism with the scan cycle. Each memory location contains a previous character code and a previous count number designating the number of times the special data character was previously sent. Furthermore, there is provided a first read-only memory having address inputs connected to receive a currently transmitted data character, having memory locations programmed to assign an individual character code to each special character and a non-special character code common to all non-special characters, respectively, and having data outputs furnishing this current character code. A second read-only memory is programmed to derive output information in form of the current special character code and an incremented count number from a combination of the current character code supplied by the first read-only memory, the previous character code and previous count number, both obtained from the random access memory. This output information is stored in the random access memory at the currently selected memory location. The second read-only memory, furthermore, is programmed to generate in dependence upon a maximum count a detection control signal representing the status of a detected special character sequence.

The design structure of this special character sequence detection circuit arrangement allows for tracing the stream of data characters received at the central exchange automatically in synchronism with the scan cycle. Without interfering the transfer of data to the central exchange each incoming data character is evaluated if it is possibly a special character comprising a part of a special character sequence to be detected.

The addressing scheme of the random access memory easily allows for tracing any one of the line terminators individually without having a need to buffer the complete stream of data for a number of scan cycles.

Furthermore, the design is very flexible for future adjustments by using two different read only memories for recognizing a possibly special character in the received stream of data characters, and for detecting the special character sequence in itself, respectively. By design of the first read only memory any one of the characters of an established set of characters can be specified as a special character according to characteristics of data terminals adapted to be connected to the central exchange. The arrangement of the second read only memory allows for deriving updated sequence monitoring information automatically and simultaneously for all line terminators and gives the freedom for specifying the number of characters constituting a complete sequence. This flexibility even becomes more apparent from a preferred embodiment of the invention which is designed for operating at different modes of operation regarding the quantity of recognizable special characters on the one hand, and the number of characters determining a complete sequence, on the other hand. In this preferred embodiment the detection circuit arrangement is provided with a mode control unit including switch means individually to be preset for selecting a full and a limited set of special characters, respectively, in combination with a respective one of special character numbers. The mode control unit generates a corresponding character mode and number mode control signals. Furthermore, there is arranged a sequence detecting and buffering unit including means for evaluating the observed count in comparison with the character mode control signal. Subsequently this control unit generates a sequence detection signal when the current count corresponds to the selected number of characters. The control unit includes an output buffer register connected to latch the current output code when enabled by means of the sequence detection signal. This latched information is then used for triggering a corresponding control process of the central exchange. And finally, a gating control unit is arranged between the output side of the second read only memory and the input side of the random access memory. This gating control unit is connected to receive the sequence detection signal for inhibiting the transfer of the current code to the random access memory when the sequence detection signal is present.

The mode control unit enables the special character sequence detection circuit arrangement to be operated at different modes specified by a correspondingly selected quantity of recognizable special characters and a selected number of characters. Thus, any central exchange to be installed can be easily adjusted to detecting special character sequences varying in the quantity of special characters and the number of characters representing a complete sequence.

Furthermore, measures are taken to reset the contents of a respective memory location of the random access memory into an initial condition when a complete sequence has been detected by means of the gating control unit in cooperation with the sequence detecting and buffering unit. It is obvious that the gating control unit also can be used for inhibiting a transfer of the output information of the second read-only memory to the random access memory when a special sequence is interrupted and further monitoring has to be aborted.

According to a further preferred embodiment of the present invention the special character sequence detection circuit arrangement can be designed to evaluate the established set of special characters which includes two transfer mode characters each specifying a FIGURES or LETTERS transfer to be assumed by the currently transmitting data terminal. This is achieved by providing in the memory locations of both the random access memory and the first read only memory further storage elements for storing transfer mode code signals each designating a respective one of the FIGURES and the LETTERS transfer mode of the associated line terminator. In addition, the first read only memory includes two further memory locations being selectable by means of a respective one of the transfer mode characters. These memory locations are designed such that storage elements designating the character code are set to the non-special character code thereby indicating that the respective special character is not associated with a special character sequence.

This preferred embodiment of the present invention refers to the characteristic of a digital telecommunication system designed for data transfer of either figures or letters wherein each figure character is associated with a respective one of the letters characters such that both are represented by the same bit pattern or character elements and are distinguished entirely by the transfer mode which the transmitting data terminal currently occupies. Whenever a data terminal is going to change the transfer mode, the transition into the other mode will be indicated by sending a transfer mode character specifying the transfer mode to be assumed.

This transfer mode character also can be interpreted as a special character distinguished from the other special characters in that the transfer mode character is a single special character and not related to a special character sequence. The detection circuit arrangement according to the present invention is designed to recognize the transfer mode characters as special characters, to detect thereby a transition from one transfer mode to the other, and to store a transfer mode code signal associated with each activated data terminal communicating with the telecommunication system across an associated line terminator. The transfer mode code signal is stored in the random access memory and maintains unaltered until the next transition of the transfer mode.

Evidently, as soon as a transmitting data terminal assumes a different transfer mode the respective cross-connected data terminal has to be synchronized otherwise the transmitted information may be misinterpreted at the receiving end of a communication line. The detection circuit arrangement of the present invention is designed for buffering such synchronization control information.

According to another preferred embodiment of the present invention there is provided an address selector device having outputs connected to the address input of the random access memory and having two sets of selector inputs. The first set of these selector inputs is connected to receive the address signals designating the currently scanned line terminators. The second set of selected inputs is connected to receive the number of the corresponding cross-connected line terminator from the storage means for storing cross-connected control information. Thereby the random access memory location associated with the cross-connected line terminator is selected for storing therein the currently present transfer mode code signal.

These different embodiments described herein before present examples for the flexibility of the basic design concept which allows for a variety of adjustments in accordance with improvements, changes and optional features of the central exchange of a digital telecommunication system become more apparent from the following detailed description.

BRIEF DESCRIPTION OF THE DRAWINGS

A better understanding of the invention may be had by reference to the following description of a preferred embodiment in conjunction with the accompanying drawings.

FIG. 7 shows a table representing schematically the layout of the sequence count programmable read only memory.

FIG. 8 shows a table representing schematically the operation of the sequence count programmable read only memory with respect to an observed special character sequence.

DETAILED DESCRIPTION OF THE PREFERRED EMBODIMENT

Figure 1:
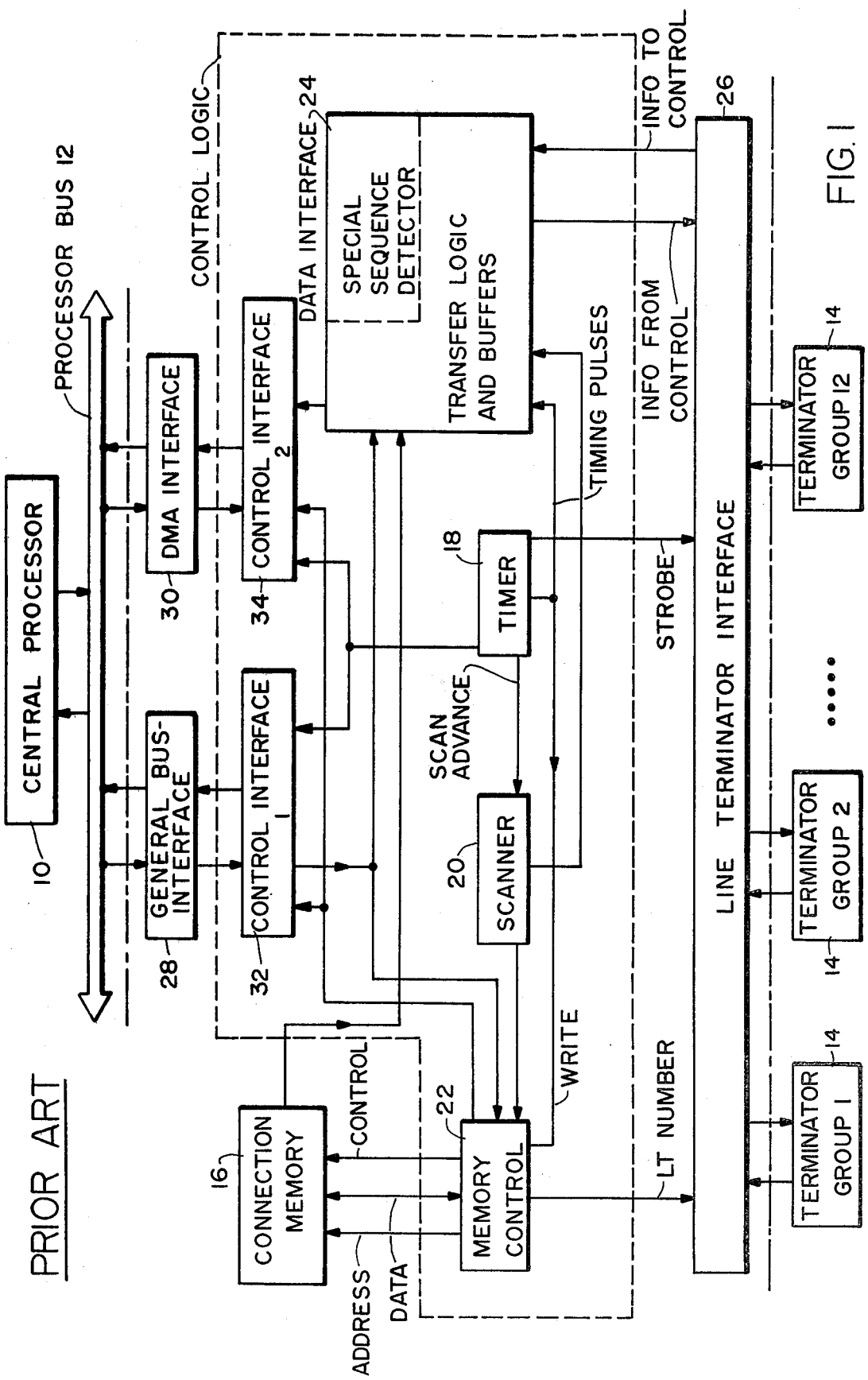
FIG. 1 shows a block diagram of the central exchange of a conventional digital telecommunication system wherein a special character sequence detection circuit arrangement comprises a section of a data interface unit of the central exchange.

The Communications Controller (FIG. 1)

The block diagram shown in FIG. 1 mainly depicts the basic structure of a conventional communications controller of a central exchange control of a conventional telecommunications system and is represented here to establish a basis for better comprehension of the present invention.

The communications controller serves as an interface device for the information flow between a plurality of terminator groups 14 and a central processor system, represented by a central processor 10 and a processor bus 12. Any terminator group 14 represents a multiplicity of line terminators each establishing a communication link to an associated data terminal or subscriber, not shown. Under program control of the central processor 10, the communications controller establishes and maintains all subscriber connections and sequentilly scans all line terminators for transferring data to the central processor or to another line terminator during a call-connect phase. The latter type of data transfer is performed without occupying the central processor 10 by means of control information stored in a connection memory 16. A number assigned to each line terminator serves as an address of a memory word containing among others the number of the currently cross-connected line terminator.

This control information specifies the various currently established connections between respective pairs of line terminators and is constantly updated under control of the central processor 10.

Designed for performing input/output operations, the communications controller is provided with a control logic formed of a group of control devices and interfaces. The control devices include a timer 18, a scanner 20 and a memory control unit 22 associated with the connection memory 16. The timer 18 generates clock pulses carried to the line terminators for synchronizing the processing of incoming and outgoing signals. In addition, the timer supplies the internal timing signals pulses for the communications controller. This group of internal timing signals includes a scan advance pulse SAP synchronizing the scanner 20. A write timing signal "WRITE" controls storage operations of the connection memory 16. The same signal, in combination with further timing pulses TP, is supplied to a data interface unit 24 which will be described later in more detail. Triggered by the scanner advance pulse SAP, the scanner 20 initiates the sequential scanning of the line terminators by generating line terminator numbers "LT NUMBERS". In response, a selected line terminator sends information to the communications controller across lines designated "INFO TO CONTROL" which correspond to lines "INFO FROM CONTROL" for the opposite transmitting direction.

The sequential addresses generated by the scanner 20 are also carried to the memory control unit 22. An address selection logic of this control unit can either select the address received from the scanner 20 or address information received from the connection memory 16. The address generated by the scanner points to a location of the connection memory containing the line terminator number of the currently cross-connected line terminator. By means of this line terminator number, the memory control unit 22 generates a line terminator address calling for the cross-connected line terminator to receive the information transmitted from the originating line terminator whereupon scanning proceeds to the next line terminator.

The described control units, in common, form the main control sections of the communications controller and are referred to as control logic. Furthermore, the communications controller is provided with a variety of interface units. Two levels of interface units can be distinguished. One interface level is composed of peripheral communication links of the control logic with the surrounding system sections, the terminator groups and the central processor system. The second interface level comprises interface units internally arranged in the control logic and forming adapter and buffer units associated with the peripheral interface units.

One of the peripheral interface units is the line terminator interface 26. Line drivers and receivers transmit signals to and receive signals from the line terminator groups 14. Individual driver groups route command information and data information referenced as "INFO FROM CONTROL" from the communications controller to the terminator groups. Corresponding receiver groups receive from the terminator groups concerning control information and data information referenced as "INFO TO CONTROL" which is to be sent to the communications controller. Information transfer to the central processor is achieved by a pair of further interfaces. A general bus interface 28 includes the logic and buffering necessary for program-controlled transfers of data words between the central processor 10 and the control logic. The second interface to the central processor system is a conventional direct memory access (DMA) interface 30.

These processor interfaces are associated with corresponding internal interface devices of the control logic designated as first and second control interfaces 32 and 34, respectively. Both control interfaces 32, 34 mainly are selector devices. It may be noted that the central switch, in fact, is provided with a second identical processor system not shown for simplicity, which is constantly updated and is thus enabled for an immediate takeover when the operative processor system fails. Correspondingly, both processor systems are associated with separate general bus interfaces and DMA interfaces. The first control interface 32 receives data from the general interface 28 associated with the currently active central processor and distributes data to the various logic units of the communications controller to initiate operations commanded by the central processor.

Correspondingly, the second bus interface unit 34 is associated with DMA interfaces. It sends data words to the DMA stack of the respective central processing system. The source of the transmitted information can be a line terminator or one of the various control units of the communications controller. Accordingly, the second control interface unit 34 selects the proper source and formats received information into the word structure of the DMA interface.

A further internal interface device, the data interface 24, has been mentioned. It includes data buffers, test and control logic for the various types of data transfers and also the special character sequence detection circuit arrangement. The buffers store input data received from the line terminators, output data to be sent to the line terminators, including data received from a cross-connected line terminator or data comprising control information generated by the central processor 10. The entire data interface 24 is not of major concern here and therefore will be described in more detail only as far as necessary for a complete understanding of the characteristics of the present invention.

Figure 2:
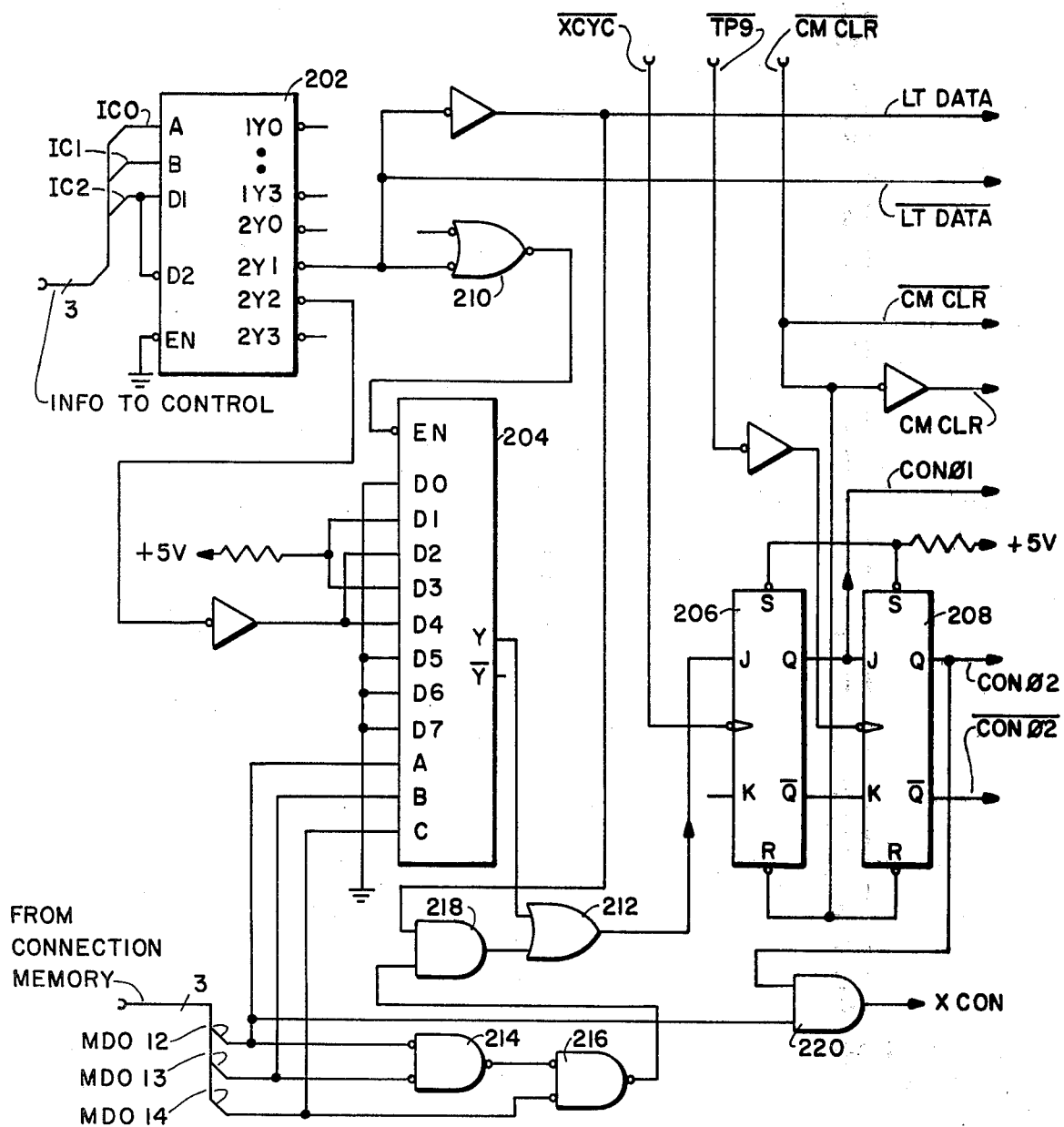
FIG. 2 shows a block diagram of a control logic of the data interface unit generating control signals for controlling the overall operation of the special character sequence detection circuit arrangement.

The Control Logic of the Data Interface Unit (FIG. 2)

The control logic of the data interface unit 30 is illustrated in FIG. 2 in as much detail as reasonable to obtain a better understanding of the operation of the special sequence character detection circuit arrangement. The data interface unit 30 receives the constant flow of information transmitted from the scanned line terminators. This information includes control information reflecting the current status of a currently scanned line terminator. The control information is represented by three information control bits IC0 through IC2 which are furnished to data inputs of an octal decoder 202. As a result of the decoding of input data, one of three outputs 2Y1, 2Y2 and 2Y3, respectively goes low. A status code "001" (IC0=1, IC1 and IC2=0) indicates that the scanned line terminator contains data. When this code is received at the decoder 202, its output 2Y1 goes low and furnishes an output signal, the negative data status signal $\overline{\text{LT data}}$ and by means of an inverter 203 the positive data status signal LT data. When the scanned line terminator transmits a status word, a status code "010" is generated and triggers output 2Y2 to go low. By this status code various modes of the communications controller may be initiated. In the present discussion, the normal mode of the communications controller is of major interest, i.e. when the communications controller is enabled to receive data information from a selected line terminator and to send it to another line terminator.

The logic which controls this connection mode of the communications controller comprises an 8-line-to-1-line data distribution unit 204, a pair of dual flip-flops 206 and 208 and associated control gates. The purpose of the connect flip-flops 206 and 208 is to allow the data transfer to be executed for a connection of one line terminator to another line terminator and to inhibit a scan advance during the transfer period. In addition, the special character detection circuit arrangement may cause the triggering of the connect flip-flops. This results in a "pseudo" connection during which extension of a scan operation the detection circuit arrangement completes a cycle.

The connect flip-flops 206 and 208 are mainly controlled by the distribution unit 204 which is enabled when a low signal is applied to its enable input EN connected to decoder 202 acros a negative NOR gate 210. Thus, the distribution unit is always enabled when a scanned line terminator transmits data. A second input of the NOR gate 210 is represented without connection depicting that the distribution unit may be enabled under various conditions, which are of no concern here.

When enabled the data distribution unit 204 selects one of eight data inputs D0 through D7, depending on the code applied to its selection inputs A through C. The selection inputs receive an information disposition code which is part of a data word read out from the connection memory 16 and comprising a line terminator number encoded in memory data output bits MDO 0 through MD0 11 and the information disposition represented by corresponding bits MDO 12 through MDO 14.

Various modes of the communications controller can be designated by the information disposition code. Reference is made to just two conditions which are of concern with reference to the present invention. The information disposition code of "000" reflects a busied out condition wherein the communications controller is commanded by the central processor to send nothing. When this information disposition code is present at the selection inputs A,B,C, the data input D0 is selected. This data input is connected to ground and the normal output Y of the distribution unit 204 goes low when input D0 is selected. This signal condition is carried to a first input of an OR gate 212. In addition, the information disposition code is applied to a 3-input negative AND gate consisting of two negative NAND gates 214 and 216. Both negative NAND gates 214 and 216 are enabled since it is assumed that all bits of the information disposition code are low. Thus a second low signal is applied to the OR gate 212 across a further AND gate 218 which is connected to receive the data status signal LT DATA. The AND gate 218 is provided for generating a pseudo connect cycle. This condition results in a low signal applied to the J input of the first connect flip-flop 206. A clock pulse is represented by a transfer control signal $\overline{\text{X CYC}}$ to be described later in more detail. Upon the arrival of the next clock pulse, a zero is clocked into the connection flip-flops 206 and 208. This state specifies that no connection is allowed to take place. In contrast, the information dispostion code "001" initiates the normal mode of the communications controller, when the controller sends data to another line terminator and also status information to the central processor. When this information disposition code is applied to the selection inputs A,B,C of the distribution unit 304 the data input D1 is selected. This data input is always high and accordingly a high signal is generated at the normal output Y of the distribution unit 204. This signal is carried to the J input of the first connect flip-flop 206 across the OR gate 212 and primes the connect flip-flops 206 and 208 which are set one after the other upon arrival of the respective clock pulses $\overline{\text{X CYC}}$ and TP9. The latter clock pulse is one of the timing pulses generated by the timer. In the set condition the connect flip-flops 206 and 208 generate two connect control signals CON ∅1 and CON ∅2, respectively indicating that a connection is allowed to take place. The actual connection is controlled by a cross-connect signal X CON which is generated by a further AND gate 220 connected to receive the second connect control signal CON ∅2 and the least significant bit MDO 12 of the information disposition code.

It has been mentioned that the connection flip-flops 206 and 208 also can be forced to be set for initiating a "pseudo" connection. This connection, as will be explained later in more detail, is necessary when the communications controller takes the special character sequence mode. The conditions which cause a pseudo connection to occur are in this case: the selected line terminator contains data and sends a status code of "001" on the information lines carrying the information control bits IC0 through IC2 and the information disposition code represents a mode other than "busied out" on the lines carrying the memory data bits of MD0 12 through MD0 14. In this case, the AND gate 218 is enabled and carries a high signal to OR gate 212 which primes the first connect flip-flop 206 and forces both connection flip-flops to the connect state upon arrival of the respective clock pulses $\overline{\text{X CYC}}$ and $\overline{\text{TP 9}}$. The purpose of forcing a connection at this time is to allow an extra cycle in the special character sequence detection circuit arrangement, as will be described later in more detail.

Furthermore, an initialization control signal $\overline{\text{CM CLR}}$ may be noted here. This signal generated by the memory control unit 22 controls an initialization mode of the communications controller and becomes low whenever the contents of the connection memory 16 are cleared. This condition is used among others to reset the connect flip-flops 206 and 208 inhibiting any connections during initialization.

Figure 3:
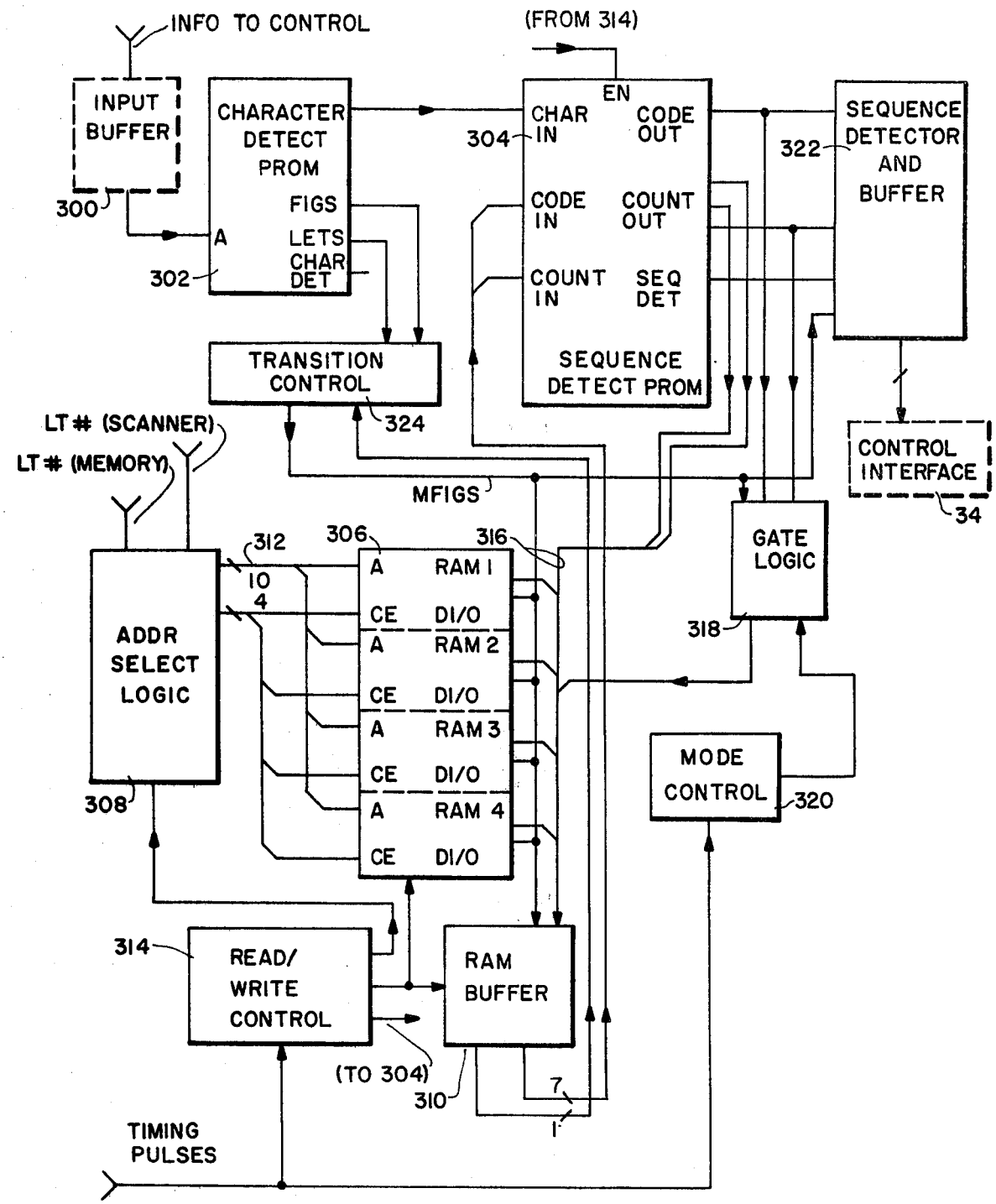
FIG. 3 shows a block diagram of the special character sequence detection circuit arrangement including a character detect programmable read only memory, a sequence detect programmable read only memory, a random access memory and associated control circuitry.

The Special Character Sequence Detection Circuit Arrangement (FIG. 3)

The preceding description of the communications controller and the data interface control with reference to FIGS. 1 and 2, respectively, prepared the basis for the following detailed description of the special character sequence detection circuit arrangement forming a part of the data interface 34.

As well known in the art, digital telecommunications systems are provided with just a limited set of characters because of a fixed frame of elements per character. To overcome this limitation, often special characters are defined which when transmitted in a consecutive sequence of established frequency are used to transmit a special code for triggering a corresponding control routine. Such special codes may be part of a message header indicating the following start of a message transfer or may request an answer back among others. In addition, optional features of the telecommunication system can be initiated by transferring such a special code, for example, to activate selective print out of call records and to establish and maintain a conference call, etc. Special character sequences are transferred in the same manner as any other data and the data transfer needs to be evaluated for distinguishing special characters from normal data characters. The purpose of the special character sequence detection circuit arrangement is to evaluate the stream of data characters coming in from the line terminators in order to distinguish non-special characters from special characters and to initiate corresponding control routines when a special character sequence is detected.

The block diagram shown in FIG. 3 represents the overall structure of this circuit arrangement. At the data input side of the circuit arrangement there is schematically indicated an input buffer 300 which is part of the mentioned buffers sections of the data interface unit 34. It receives a data character transmitted by a currently scanned line terminator across the input lines "INFO TO CONTROL". Facing the buffer output there is arranged a programmable read only memory (PROM) designated as a character detection PROM 302. The latched outputs of the input buffer 300 present a current address for the memory for selecting one of its memory locations, each containing a pre-assigned code corresponding to the presented character. The selected code is present at memory outputs. Any output bit pattern specifically designates one of a plurality of special characters or a non-special character. It may be noted here that any character of the established set of characters can be predetermined to be used in a special sequence and then is designated as special character. However, this does not exclude the use of such a character for normal data transfer. The character detection PROM 302 is provided for nothing else but for detecting the characters which may form part of one of the predetermined special sequences and triggers the detection of a special character sequence. The present invention preferably is designed for detecting up to fifteen different special characters each specified by a corresponding character code number. All other characters presented to the character detection PROM 302 are non-special and are commonly assigned a non-special character code number.

Facing the output side of the character detection PROM 302 there is arranged a second programmable read-only memory, the sequence detect PROM 304. This second memory basically performs a logical operation for determining if a special sequence is under observation.

As will become more apparent later, this is achieved by evaluating the current character code number "CHAR IN" in combination with the codes "CODE IN" of the data characters sent out from the same line terminator previously. These data are applied to address inputs of the sequence detect PROM 304. In addition, a three-bit count code specifying the number of times that the same special character has been received during previous scan cycles is applied to further address inputs.

The previous character code and the previous count both are obtained from a sequence count memory 306. It is composed of four random access memory (RAM) sections. It is associated with an address select logic 308 for deriving a current RAM address and a RAM buffer register 310 arranged to receive output data of the sequence count memory. The structure of the sequence count memory reflects the line-oriented approach of the present character sequence detection scheme tracking each line terminator by means of a separate memory comprising a multiplicity of memory locations, each assigned to a respective one of the line terminators. As previously described, during a scan cycle each line terminator is cyclically selected by means of a line terminator number for sending information to the communications controller. The line terminator number, in parallel, is received at a first set of address inputs of the address select logic 308 for addressing the sequence count RAM 306 via an address bus 309. A second set of address inputs of the address select logic is connected to another multiple line carrying address information which is supplied by the connection memory 16 and represents the number of the cross-connected line terminator.

This address selecting scheme allows, during a scan operation of a scan cycle, either to address the sequence count memory location assigned to the presently scanned line terminator or the memory location associated with the cross-connected line terminator. The purpose for selecting both types of address enables storing of control information with respect to both line terminators associated with the calling subscriber and a called subscriber, respectively.

At the moment, the purpose of the first addressing scheme will be described in more detail. The addressing of the sequence count memory is synchronized with the scanning cycle by means of the line terminator number received by the address select logic 308 from scanner 20. In other words, the addressing of the memory is synchronized with the stream of data characters received at the input buffer 300. The less significant bits of the multiple output signal of the address select logic 308 are commonly supplied across respective lines of the address bus 312 to inputs of the four sequence count RAM sections. In addition, the address select logic 308 furnishes four enable signals each enabling a respective one of the four RAM sections. Thus, a memory location is selected for performing a read or write operation.

The kind of operation performed with respect to the selected memory location is determined by a read/write control unit 314 which generates control signals for the devices of the special character sequence detection circuit arrangement based upon timing signals received from timer 18.

During a scan operation of a specific line terminator, at first a read operation from the selected memory location of the sequence count memory 306 is initiated. The memory contents of the selected memory location are transferred onto a data bus 316 commonly connected to all RAM sections and to the RAM buffer register 310. At this time, the RAM buffer register is enabled to store the memory word currently present on the data bus 316. In synchronization with the transfer of the data character from the presently scanned line terminator to the input buffer, the contents of the RAM buffer 310 are read out and carried to respective inputs of the sequence detect PROM 304. Thus, address signals corresponding to the previous code and the previous count are supplied to the input side of this control memory. Together with the respective character code associated with the currently presented data character, the entire address of the sequence detect PROM 304 is established for selecting a storage location. The contents of a word of the sequence count PROM 306 are pre-determined such that a 4-bit group comprises the character code number; a 3-bit group forms an updated output count code and a single bit furnishes a signal "sequence detected", if applicable.

At the output side of the sequence count PROM 306, there is arranged a gate logic unit 318. This unit receives control signals in the form of the most significant bit of the output count and in the form of mode control signals generated by a further device, the mode control unit 320.

The mode control unit 320 basically is a switch arrangement composed of fixedly set switch connections. In this preferred embodiment different special character sequence modes can be chosen for determining different modes of operations. A sequence can be determined to comprise either four or five consecutive characters and the set of special characters may be limited to three or fifteen characters, respectively. A transfer of the output code of the sequence detect PROM 304 to the data bus 316 shall be inhibited when a sequence is either interrupted or completed. In these cases the respective memory location of the sequence count memory 306 reflects a normal condition representing that no special sequence is being observed currently. Above, an overview of the structure of a special character sequence detection circuit arrangement has been given to show that first a character code number is derived from the data character being present at the input buffer 300. This code is evaluated by the sequence detect PROM 304, in combination with information stored in the sequence count memory 306. This memory is line-oriented and buffers the previous character code number in combination with the number of consecutive occurrences of this code number during previous scan cycles. The sequence detect PROM is programmed such that each combination of different character code numbers automatically leads to an abortion of the sequence count by emitting the presently occurring character code number in combination with a reset count at the outputs. If both input character codes, the code number, and the input code, are special and identical, it is derived that a special character sequence is continuing and the output count is updated.

As long as the maximum count is not reached, the present signal condition including the character code and the updated output count are restored in the sequence count RAM 306 at the memory location associated with the presently transmitting line terminator. The maximum count indicates that a sequence of proper length is detected and the code for a non-special character counter is written into the sequence count RAM representing that a special character sequence is no longer under observation.

Whenever a special character sequence has been detected, corresponding control information has to be transferred to the central processor system. Accordingly, there is provided a sequence detect and buffer logic 322 connected to receive the output code for intermediate storage. This output code will be transferred to the control interface 34 (FIG. 1) if a further output signal "SEQ DET" of the sequence detect PROM 304 is present.

A special case has to be considered yet. It it typical for telex machines and similar data terminals that figures or letters can be transmitted by determining a "FIGURES" mode and "LETTERS" mode and by transmitting corresponding mode control information, designating the mode to be assumed, whenever the transmitting mode changes. Based upon this mode control information, the receiving data terminal is synchronized such that both cross-connected data terminals and the respective line terminators are set to the same transmitting mode. The special character sequence detection circuit arrangement is designed to recognized such a transition and to store synchronizing control information.

The transmitting mode control information comprises two characters "FIGURES" and "LETTERS"

which are interpreted like special characters, except for the characteristic to form no part of a special character sequence.

The special characters "FIGURES" and "LETTERS" are also recognized by the character detect PROM 302 which comprises two respective memory locations. Accordingly, output signals indicating the FIGURES and LETTERS transmitting mode, respectively are generated. Corresponding output lines of the character detect PROM 302 are connected to inputs of a transition control unit 324. This device basically is a comparison unit for comparing the currently indicated mode of operation with the previously selected mode of operation. It generates an output signal whenever a transition is detected. A detected transition results in an abortion of any previous special character sequence and in changing the transmitting control bit stored in the sequence count RAM 306. The output of the transition control unit 322 is connected to a further data line which is referenced MFIG in FIG. 3 and which can be interpreted as an extension of the data bus 316 DATA BUS. The transmitting control signal is thus stored in the sequence count RAM, but also carried to the sequence detect and buffer logic 322. In addition, a detected transition affects the operation of the gate logic unit 318. The transmitting control signal applied to the gate logic unit 318 inhibits a transfer of the output code of the sequence detect PROM 304 onto the data bus 316, thereby aborting any previous special character sequence.

Furthermore, any transition detected by the transition control unit 324 will result in an extended write cycle of the sequence count RAM 306 of the sending line terminator is in the cross-connect mode. In this case, the address select logic 308 is controlled to select its second set of inputs which receive the number of the cross-connected line terminator for selecting the memory location associated with this line terminator and for storing the transmitting control bit currently output by the transition control unit 324. Thus, the transmitting control signal representing the current transmitting mode is separately stored in the sequence count memory for both cross-connected line terminators. Having described the concept of the special character sequence detection circuit arrangement, a more detailed description of the implementation of the major sections of the special sequence character detection circuit arrangement will be given in the following.

Figure 4:
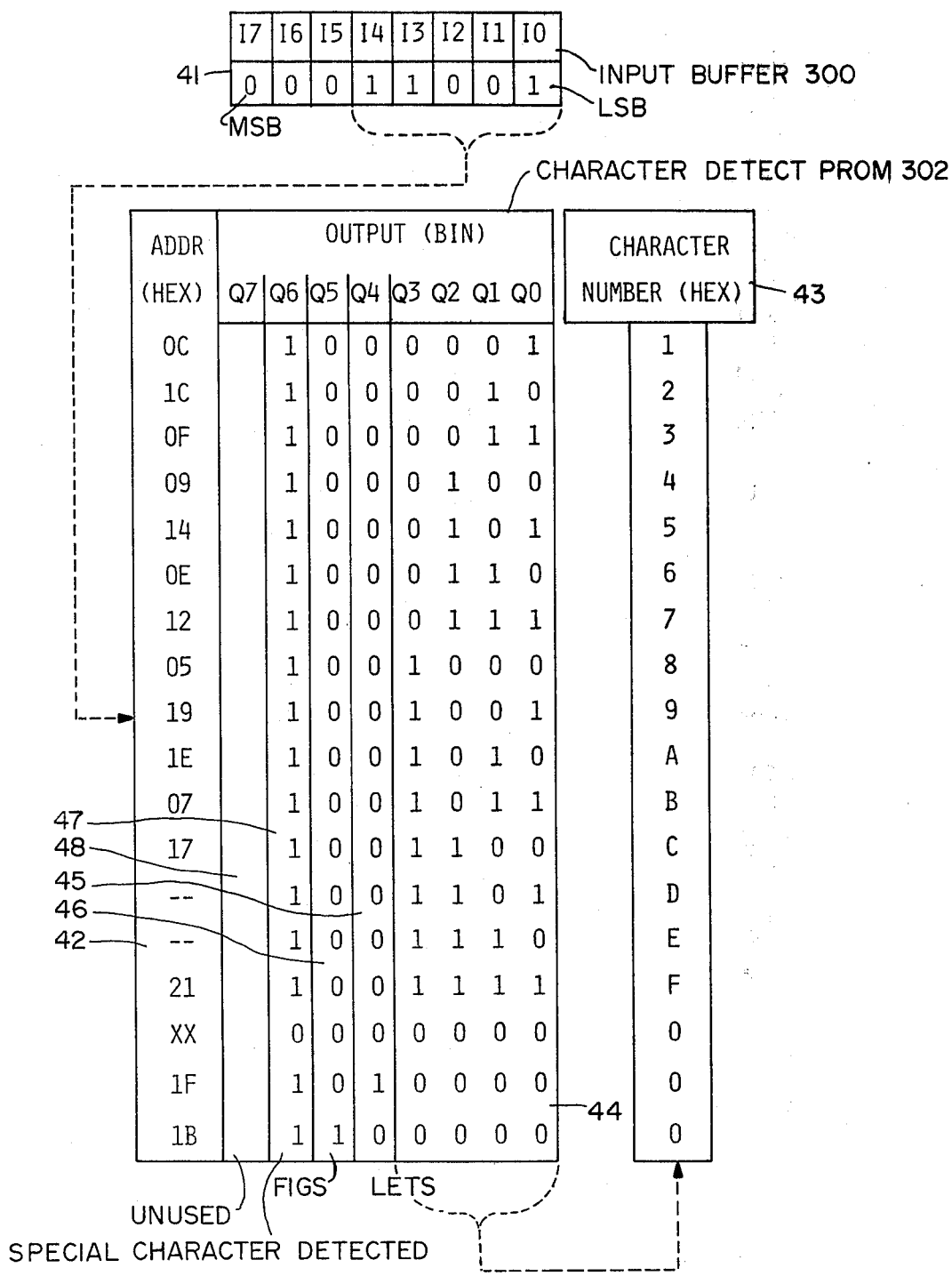
FIG. 4 shows a table representing the layout of the character detect programmable read only memory.

The Character Detect PROM (FIG. 4)

FIG. 4 illustrates in form of a schematic chart, the layout of the character detect PROM 302 which can be implemented by a commercially available integrated circuit manufactured by Monolithic Memories Inc. as programmable read only memory chip 6341. At the top of the chart there is arranged a block representing the input buffer 300 illustrating eight buffer elements I0 through I7 with element I7 designating the most significant bit MSB and element I0 carrying the least significant bit LSB of the current buffer contents.

Corresponding to the five-bit level of data characters of a conventional telecommunication system, five of the less significant bits present at buffer elements I4 through I0 represent the data character to be evaluated. The bottom line 41 of the block represents a possible contents of the buffer by means of a bit pattern of an 8-bit data word.

As schematically indicated, the five less significant bits of the bit pattern determine the address of a specific memory location of the character detect PROM 302 represented in the central block. In the first column 42 at the left hand margin the different memory addresses are represented in a hexadecimal code. For the given buffer contents, it can be easily calculated that the bit pattern stored in the input buffer 300 determines an address "09" expressed in hexadecimals. For a preferred embodiment it is assumed that up to 15 special characters can be specified, as obvious from the left-hand block 43 listing character code numbes expressed in hexadecimal numbers. It may be noted that special characters which are associated with the character code numbers D and E have not been assigned to a specific data character and correspondingly, no address to the character detect PROM 302 has been specified allowing for future adjustment. In the PROM address column 42 the third line from the bottom is marked "XX". This address represents all possible bit patterns of data characters which are associated with a character code number "0". In the actual layout of the character detect PROM this line represents a multiplicity of memory locations each assigned to a non-special character. The left-hand part of the central block illustrating the character detect PROM 302 represents the memory contents and the corresponding output conditions. Each memory location of the character detect PROM 302 consists of eight bits which correspond to eight outputs Q0 through Q7. The four less significant bits of a memory word and the corresponding outputs Q0 through Q3 shown in columns 44 comprise the character code number assigned to the respective data character. The binary bit pattern of this group of outputs is identical with the character code number which is represented in the left-hand block 43 in a hexadecimal code. The "on" condition at output Q4, shown in column 45, specifies the LETTERS mode as apparent from the line before the last line. Correspondingly, the output Q5 represented in column 46 specifies the FIGURES mode which is depicted in the last line of the character detect PROM. Output Q6 represented in column 47 is always high when a special character is detected. In the present implementation this piece of information is not used for further logic operations. The most significant bit which is represented in column 48 is unoccupied.

Obviously, all data characters presented at the address inputs of the character detect PROM 302 lead to a character number other than "0" for any special character except for the special characters determining the FIGURES and LETTERS mode which are assigned the character number "0" reflecting the characteristic that these special characters do not comprise a part of a special character sequence.

Figure 5:
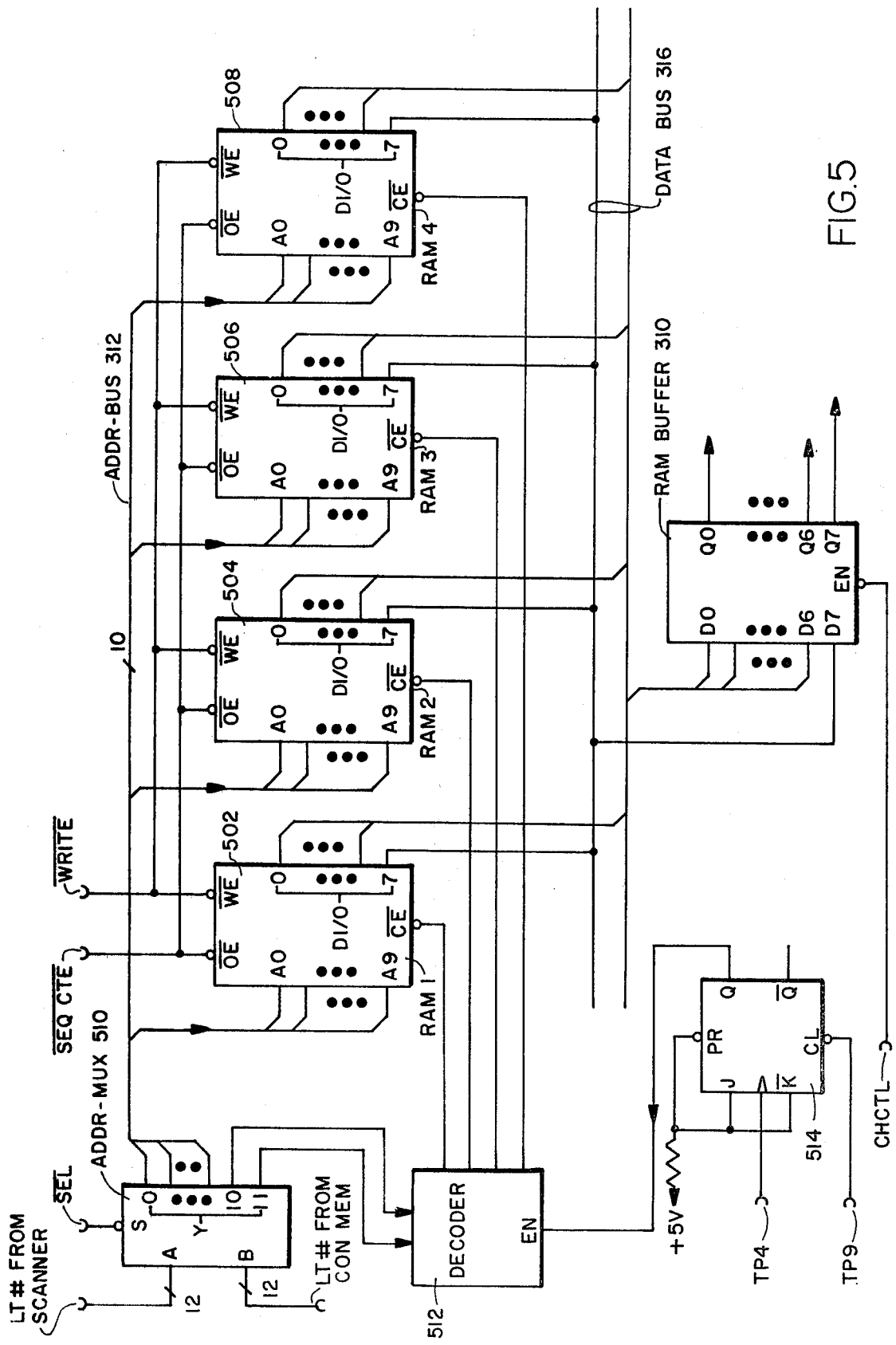
FIG. 5 shows in more detail a block diagram of the random access memory including an address selector arrangement and a random access buffer connected to the output of the random access memory by a data bus.

The Sequence Count Random Access Memory (FIG. 5)

The operation of the above described character detect PROM 302 is related to data received from the line terminators during a current scan cycle. In describing the special character sequence detection circuit arrangement with reference to FIG. 3, it has been pointed out that a traffic history concerning special characters received from the different line terminators during previous scan cycles is stored in the sequence count RAM 306. A more detailed block diagram of this memory of associated address select logic 308 and the output RAM buffer register 310 is illustrated in FIG. 5. The sequence count RAM is here represented by RAM sections 502, 504, 506 and 508 respectively. The RAM sections each are composed of a commercially available memory chip having a memory capacity of 1K×8 bits. For the present purpose, a memory chip MK4801-70 manufactured by MOSTEK may be used. In accordance with its memory capacity each chip has 10 address inputs A0 through A9 and common data input/output facilities referenced as DI/O 0 through DI/O 7. Accordingly, for distinguishing between write and read operations respective control inputs $\overline{WE}$ and $\overline{OE}$ are provided. The memory chip is designed for easy cascading by means of a chip enable input $\overline{CE}$. The total memory capacity of 4K memory words corresponds to a configuration of the digital telecommunications system servicing up to 4,096 line terminators. Obviously, the number of memory sections reflects this system requirement and is directly dependent upon the number of line terminators connected to the central exchange. Respective address inputs of the different RAM sections are commonly connected to a corresponding line of address bus 312. Correspondingly, the data input/output leads DI/O 0 through DI/O 10 are commonly connected to the bidirectional data bus 316.

The address select logic represented by a common block 308 in FIG. 3 is here illustrated in more detail. It is composed of an address multiplexor 510 which can be implemented by commercially available 2-line-to-1-line data multiplexors, as for example, integrated circuits 74 LS 157 manufactured by Texas Instruments. Thus, a first set of inputs schematically indicated by reference symbol A and a second set of inputs correspondingly referenced by B are provided. Each respective input corresponds to one of the outputs Y0 through Y11. In the given case of 4,096 line terminators, the line terminator number is encoded into a 12 bit pattern and correspondingly each of the input sets is connected to a respective multiple line. The purpose of the address multiplexor 510 is to select a line terminator number received either from the scanner 20 or the connection memory 16. (FIG. 1)

The former line terminator number is selected during a normal scan operation when the memory location associated with the currently scanned line terminator is to be addressed. The latter line terminator number is selected during an extended scan operation for addressing the memory location associated with the cross-connected line terminator. Details of the extended scan operation will be described later. The input selection is performed under control of a select control signal $\overline{SEL}$ which is generated by the read/write control unit 314 to be described in detail.

The ten less significant outputs of the address multiplexor 510 each are connected to a respective line of the address bus 312. The two most significant outputs Y10 and Y11 of the address multiplexor 510 each are connected to a respective input of a 2-to-4-line decoder 512 which generates the chip enable signals CE for the different RAM sections 502, 504, 506 and 508, respectively. Because of the bidirectional characteristic of the data bus 316 the chip enable signals have to be synchronized with the scan operation. This is achieved by means of a control flip-flop 514 which is primed by a fixed positive signal voltage level applied to its inputs J and K. The flip-flop is set by one of the timing pulses TP4 generated by the timer 18 (FIG. 1) and is cleared by a corresponding timing pulse TP9. The positive output of the control flip-flop 514 is connected to an enable input EN of the decoder 512. Thus, the decoder generates chip enable signals $\overline{CE}$ only when enabled during the time span defined by the timing pulse TP4 and its later correspondent TP9.

FIG. 5 also depicts the output RAM buffer register 310 which simply is a buffer register composed of a Texas Instruments component 74 SN 116. The register inputs D0 through D7 are connected to the data bus 316 to receive output data present on the data bus as a result of a read operation of the sequence count RAM. The RAM buffer register 310 is enabled to buffer data by means of a "character to latch" control signal CHCTL. In connection with a detailed description of the read/write control unit 314 it will become more apparent later how this control signal is derived. Basically, this control signal is generated to control data transfer across the data bus 316, i.e. to complete a read operation of the sequence count RAM 306 at a proper time during the time frame of a scan operation and to trigger holding of sequence count RAM output data for evaluation by the sequence detect PROM 304.

Figure 6:
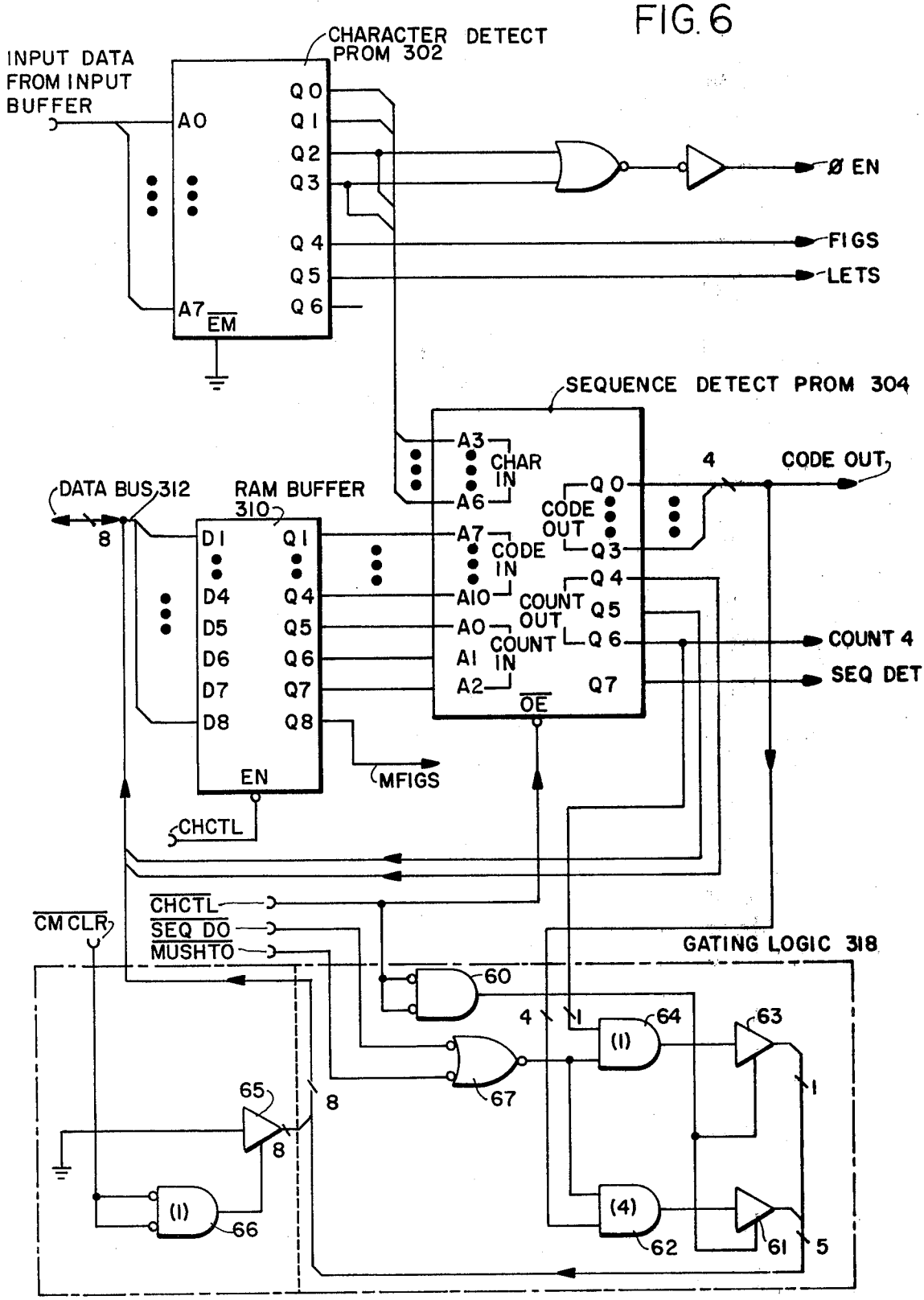
FIG. 6 shows a block diagram representing in more detail the arrangement of the sequence detect programmable read only memory and surrounding circuitry including a gating logic arranged between outputs of the sequence detect programmable read only memory and the data bus.

The Sequence Detect Prom and The Gating Logic
(FIGS. 6 to 8)

For a more detailed description of the sections of the special character sequence detector circuit arrangement provided for detecting a special character sequence, the sequence detect PROM 304 and associated circuitry is represented in the block diagram of FIG. 6. It shows once more the previously described character detect PROM 302 and the RAM buffer register 310 in an arrangement together with the sequence detect PROM 304. The sequence detect PROM 304 is implemented by a 2K by 8-bit EPROM component MK 2716 manufactured by MOSTEK. This memory layout requires that it is provided with 11 address inputs referenced A0 through A10 and eight data outputs referenced Q0 through Q7. The address inputs are arranged in three groups. A first bit group is associated with the character code number received from the character detect PROM 302, is referenced "CHAR IN" and is applied to address inputs A3 through A6. A second bit group is referenced "CODE IN", respective address inputs A7 through A10 of the sequence detect PROM 304 are connected to receive corresponding output signals generated at the less significant data outputs Q1 through Q4 of the RAM buffer register 310. The third bit group specifies the previous count and is referenced "COUNT IN". The corresponding least significant address inputs A0 through A2 of the sequence detect PROM 304 are connected to the outputs Q5 through Q7 of the RAM buffer register 310.

Correspondingly, there are provided three groups of data outputs. The four least significant outputs Q0 through Q3 carry an output code, the following three outputs Q4 through Q6 carry an output count and a single output Q7 furnishes a sequence detected control signal referenced "SEQ DET".

The layout of the sequence detect PROM 304 is schematically represented in FIG. 7. The memory comprises 16 memory sections, but only the first one of these sections is completely represented in the top part of the pattern. Any memory section is selected by means of the input code applied to the most significant address inputs. If previously no special character sequence was under observation and correspondingly the bit pattern representing the previous code contains zero, the first memory section is selected. In all other cases, the character code read out from the sequence count memory 306 and latched into the RAM buffer register 310, determines which one of the other memory sections is selected. Since as assumed 15 special characters are designated and one memory section is needed for a zero code 16 memory sections in total are provided.

Each memory section furthermore, is divided into 16 memory subareas, each comprising eight memory locations which are represented by one half of a line of the pattern shown in FIG. 7. The memory subareas each are associated with a respective character number which is supplied to the address inputs A3 through A6 of the sequence detect PROM 304. Therefore, also the number of memory subareas is dependent upon the established number of special characters. The length of each memory subarea is determined by the specified length of the special character sequence. Here, each memory subarea consists of eight memory locations and any sequence can be specified by up to seven consecutively occurring special characters.

In the present embodiment, the maximum length of sequences to be recognized is determined by five characters. Accordingly, three memory locations of each memory subarea are not used and the corresponding memory contents are "FF" expressed is hexadecimals.

The structure of the layout of the sequence count PROM 304 will become more apparent from an example represented in the schematic shown in FIG. 8, illustrating the varying address and corresponding output conditions of a specific sequence during five consecutive scan cycles. The address portion of the schematic represents the three different address signal groups designated CODE IN", "CHAR IN" and "COUNT IN". In combination, these address groups represent a complete PROM address. Five different bit patterns occurring during five consecutive scan cycles are represented in five consecutive lines of the address area. In addition to the binary representation of these address conditions, the same conditions are represented in a hexadecimal code for an easy comparison with the layout of the sequence count PROM as illustrated in FIG. 7.

Obviously, the converted address is based on bit groups each comprising up to four bits of the address and including address bits A0 through A3, A4 through A7, and A8 through A10, respectively.

In the right-hand portion of the schematic of FIG. 8, the memory contents of the addressed memory locations are illustrated by both a binary bit pattern and a hexadecimal code. The four least significant bits form the output code, the next following three bits determine the output count, and the most significant bit position of the output data specifies the sequence detected control signal "SEQ DET" which is high when a sequence is detected.

In the given example, it is assumed that the observation of a new special sequence starts with the first scan, correspondingly the previous code is "0000". The character number received from the character detect PROM 302 may be "1" and the previous count "0", which results in a hexadecimal address "008". As depicted in FIG. 7, the memory contents of the respective memory location are "11" which corresponds to data indicated in the data output field illustrated in FIG. 8. The corresponding bit pattern depicts that the count is updated by "1" and that the character output code which is to be stored in the sequence count memory 306 is identical with the received character code number.

Assuming that during the second scan cycle the same data character is received, the current character code number in combination with the previous code and the previous count determines a sequence count PROM address "089". The contents of the respective memory location are "21". The corresponding bit pattern shows that the character code is unaltered while the output count again is increased by "1".

During the next three scans again the same data character is received, an automatic address increment is established by means of the updating of the count and accordingly, four neighboring memory locations, in this case located in the second memory section, are selected. During the fifth scan, the previous count determines the hexadecimal address "08C" and it is evident from the corresponding memory contents that the updated count jumps to a maximum value of "8". This corresponds to an overflow which results in setting the sequence detected control bit to "1" and in resetting the output code of "0". Thus, the initial condition for detecting a new sequence is recovered. Obviously, the most significant address portion, i.e. the information about the previously stored code, determines the memory section of the sequence count PROM 304 to be selected for evaluation. If a sequence is interrupted, it can be easily inferred from FIGS. 7 and 8 that a current character code number being different from the previous code leads to another memory location within the respective memory section of the sequence count PROM. This address change results in aborting the old sequence and in starting a new sequence if the current character is a special character.

This is illustrated briefly by another example.

Assuming that the sequence shown in the bit patterns of FIG. 8 is discontinued when a different character number "3" occurs during the fourth scan. From the previous description, it can easily be derived that in this case a hexadecimal address is "09B" is generated. The selected memory contents are "13", i.e., the output count will be "1" and the output code "3". This shows that evidently 15 different memory subareas within a memory section are each associated with a specific one of the special characters and necessary to facilitate address jumps.

Referring now again to FIG. 6, it is evident that the layout of the sequence detect PROM 304 determines the structure of the gating logic 314 which is arranged between the output side of the sequence detect PROM 304 and the data bus 316. The main purpose of the gating logic 318, as previously indicated, is to feed back output information of the sequence detect PROM 304 onto this data bus 316, such that the contents of the sequence count RAM 306 are updated in accordance with any detected sequence condition. This refers basically to the code output information which is carried onto the data bus 316 in dependence upon the current output count of the sequence detect PROM 304 in view of the sequence mode as determined by the setting of the mode control unit 320. For this reason, the gating logic 318 comprises a plurality of tri-state gates, each consisting of a driver stage 61, 63 and 65 respectively and of associated logic circuitry.

Enable inputs of the driver stages 61 and 63 are commonly connected to an output of an AND gate 60 connected to receive the negative character to latch control signal $\overline{CHCTL}$ from the read/write control unit 314. Four identical driver stages 61 are represented by just one stage for simplicity. Each driver is associated with a separate one of further AND gates 62 arranged at the input side of the respective driver stage. One input of each AND gate 62 is connected to receive a respective one of the bit signals of the output code of the sequence detect PROM 304. The second inputs of the AND gates 62 are commonly connected to receive an output signal of a further negative NOR gate 67 which receives two transfer control signals SEQ DO and MUSHTO. These control signals are generated under the control of the mode control unit 320 and are to be described yet in detail with reference to FIG. 9.

A further tri-state gate comprising driver stage 63 and an associated AND gate 64 controls in a similar manner the feedback of the most significant bit of the output count, "count four" signal furnished by the sequence detect PROM 304. The remaining two less significant bits of the output count of the sequence detect PROM 304 are directly fed back onto the data bus 316. The gating logic unit 318 comprises a further group of eight driver stages 65 arranged in parallel and connected to the data bus 312 to furnish a low level signal onto each line of the data bus during the mentioned initialization mode which is controlled by the negative initialization control signal $\overline{CM\ CLR}$. The signal is received at parallel input of a further negative AND gate 66 having an output commonly connected to the control inputs of the driver stages 65. During the initialization mode of the communications controller the connection memory and the sequence count memory are cleared. This is achieved by running a complete scan cycle. Each memory location of the connection memory 16 and the sequence count RAM 306 as well is addressed and 0-bit patterns are written into the selected memory locations. The driver stages 65 when enabled by the initialization control signal $\overline{CM\ CLR}$ generate the corresponding low level signals for the sequence count RAM since their inputs are connected to ground.

Figure 9:
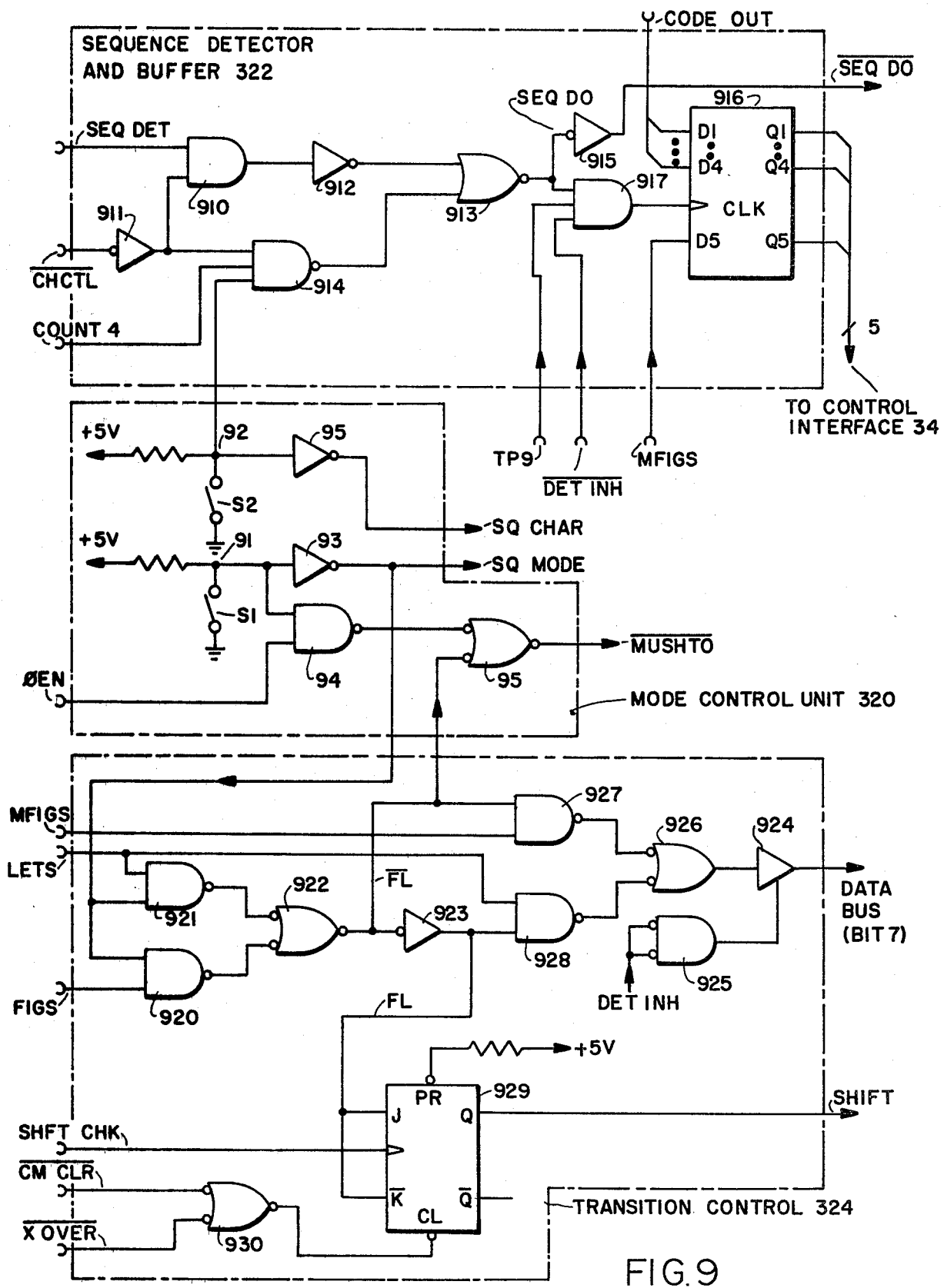
FIG. 9 shows block diagrams of further control units of the special character detection circuit arrangement including a sequence detector and buffer, a mode code control unit and a transition control unit.

The Mode Control Unit And The Sequence Detector And Buffer Unit (FIG. 9)

The control operation of the gating logic unit 318 will be more clearly understood from the following description of FIG. 9 which illustrates in detailed schematics three further control devices of the special character sequence detection circuit arrangement, the mode control unit 320, the sequence detect and buffer unit 322 and the transition control unit 324.

First it is referred to the mode control unit 320 which is mainly composed of two switches S1 and S2, respectively. The following TABLE 1 describes briefly the function of these switches which are preset during the installation of a central exchange of a telecommunications system.

TABLE 1

| SWITCH | | FUNCTION | |
|---|---|---|---|
| | | Special Characters | Characters |
| S1* | S2* | Installed | per Sequence |
| 0 | 0 | 3 | 4 |
| 0 | 1 | 3 | 5 |
| 1 | 0 | 15 | 4 |
| 1 | 1 | 15 | 5 |

*0 = switch open
1 = switch closed

This table indicates four different special character sequence modes each corresponding to one of the four possible switch combinations. The first switch S1 determines the actually used number of special characters and the second switch S2 controls how many consecutive characters determine a complete sequence. Both switches S1, are connected to ground on the one hand and by a resistor to positive supply voltage, on the other hand. Respective connector taps 91, 92 connecting one switch connector to the resistor carry a high or low signal level depending on the setting of the respective switch.

The connector tap 91 associated with the first switch S1 is connected in parallel to an input of a further inverter 93 and a first input of a further NAND gate 94. The inverter supplies a sequence mode control signal SQ mode which is high if the extended set comprising 15 characters is used and which is low if just three special characters are specified. The second input of the NAND gate 94 receives an enabling control signal ∅ EN which is derived from the two most significant bits of the character code number generated by the character detect PROM 302 (see FIG. 6). The enabling control signal ∅ EN is in high condition whenever a character code number designates one of these special characters which are not part of the basic set of three characters.

Accordingly, the NAND gate 94 delivers a low level signal whenever the three character sequence mode is selected and the character recognized by the character detect PROM 302 is a special character of the extended 15-character set. In this case, any currently evaluated sequence has to be aborted. For that purpose the output signal of the NAND gate 94 is applied to a first input of a further negative NOR gate 95 which generates the data shift control signal $\overline{MUSHTO}$ controlling the gating logic unit 318. This negative NOR gate 95 has a second input which receives an output signal $\overline{FL}$ of the transition control unit 324. As will be described later in more detail, this control signal is always in high condition, if neither a FIGURES nor a LETTERS character is currently recognized by the character detect PROM 302.

If both inputs of the negative NOR gate 95 receive signals in high condition, the control signal $\overline{MUSHTO}$ accordingly is high and determines in this case, one condition for enabling the gating logic unit 318 for feeding back the output code of the sequence detect PROM 304 onto the data bus 316.

Furthermore, FIG. 9 illustrates the detailed layout of the sequence detector and buffer unit 318. This unit detects a complete sequence of either four or five consecutive special characters, depending on the established character mode. When a complete sequence is detected, it generates control signals for latching the character code number into a buffer and for disabling the gating logic unit 318.

For sequences consisting of five consecutive characters, the sequence detect PROM 304 furnishes correctly a sequence detected control signal SEQ DET at its most significant data output Q7 (FIG. 6), as previously described. This control signal is applied to the first input of a further AND gate 910 which receives at a second input a timing signal which is the negative character to latch control signal $\overline{CHCTL}$ applied across an inverter 911. The output signal of the AND gate 910 is carried across a further inverter 912 to a first input of a further NOR gate 913 which generates a sequence data out control signal SEQ DO at its output. The second input of this NOR gate 913 is connected to receive an output signal of a further NAND gate 914 having a first input also connected to the output of the inverter 911 for synchronization. Further, this NAND gate 914 which receives the "count four" signal represented by the most significant bit of the output count of the sequence detect PROM 304, and the sequence character control signal determining the activated sequence length with four or five characters, respectively. Not considering the timing condition, NAND gate 914 evaluates the completion of a sequence if the 4 character mode is activated. Correspondingly, the sequence data out control signal SEQ DO is always in high condition when the established sequence length is reached.

By means of a further inverter 915 the sequence data out control signal is inverted into its negative correspondent $\overline{\text{SEQ DO}}$ which is the second control signal furnished to the gating logic unit 318 for controlling the tri-state stages 61, 62 and 63, 64, respectively.

The second purpose of the sequence data out control signal SEQ DO is to trigger a data buffer register 916. This register receives the output code of the sequence detect PROM 304 and a special one bit code representing a new FIGURES or LETTERS transmitting mode. The data present at register inputs is latched into the register by means of a clock pulse which is derived from two control input conditions in combinatin with a timing pulse TP9. The clock pulse is generated by a further AND gate 917 receiving the sequence data out signal SEQ DO and a negative inhibit control signal $\overline{\text{DET INH}}$ which inhibits the transfer of a detected sequence to the central processor during a write cycle, yet to be described.

The Transition Control Unit (FIG. 9)

This control unit has been mentioned briefly and is illustrated in FIG. 9 in more detail. It receives two different groups of signals, transmitting mode control signals and data transfer control signals. The transmitting mode control signals comprise the FIGURES or LETTERS output signals generated by the character detect PROM 302 and the transmitting code bit signal representing the previous transmitting mode of the scanned line terminator read out from the sequence count RAM 306. The transfer control signals comprise the negative initialization mode control signal $\overline{\text{CM CLR}}$ being high when no initialization takes place and two control signals SHFT CHK and $\overline{\text{X OVER}}$ generated by the READ/WRITE control unit and yet to be described.

Each of the transmitting mode control signals LETS and FIGS is applied to a first input of a respective one of two further NAND gates 920 and 921, respectively. The second inputs of these gates are commonly connected to receive the sequence mode control signal SQ MODE generated by the mode control unit 320. This control signal primes both NAND gates 920 and 921 if the 15-character mode is activated. The outputs of both NAND gates 920 and 921 each are connected to a respective input of a further negative NOR gate 922 which generates the transition signal $\overline{\text{FL}}$ previously mentioned as an input signal to the mode control unit 320. The logic circuitry composed of the two NAND gates 920, 921 and the negative NOR gate 922 generates a signal in high condition if the 15-character sequence mode is activated and neither a LETTERS character nor a FIGURES character has been recognized. But as soon as the currently selected line terminator transmits the special character LETTERS or FIGURES while the 15-character sequence mode is activated, the output of the negative NOR gate 922 goes low to indicate a transition of the transmitting mode from one condition to the other.

Upon detection of a transition, following measures have to be taken: any sequence currently under observation has to be aborted and the new transmitting mode code has to be stored in the associated sequence count memory locations at the seventh bit for both the transmitting line terminator and the cross-connected line terminator. The former measure has been described with respect to the generation of the data shift control signal $\overline{\text{MUSHTO}}$ and is performed under control of the negative transition signal $\overline{\text{FL}}$. The latter measure is accomplished by logic circuitry which is described in the following.

The main control signal for performing this memory update operation is the positive transition signal FL which is generated by an inverter 923 having an input connected to the output of the negative NOR gate 922. Furthermore, there is provided a tri-state driver stage comprising an output driver 924 which is controlled by a further negative AND gate 925 receiving at both inputs the negative detect inhibit control signal $\overline{\text{DET INH}}$, previously mentioned. The input of the output driver 924 is connected to an output of a negative OR gate 926 which completes the tri-state characteristic of the output stage. Each input of the negative OR gate 926 is connected to an output of a respective one of two further NAND gates 927 and 928. The NAND gate 927 receives the stored transmitting code bit signal M FIGS at one input and the negative transition signal $\overline{\text{FL}}$ at a second input. It is, therefore, discriminated whether the previous transmitting code shall be written back into the sequence count RAM 306. The NAND gate 928 receives at a first input the positive transition signal across the inverter 923. A second input is connected to receive the current transmitting control signal LETS from the output of the character detect PROM 302. The transmitting code to be stored in the sequence count RAM is specified such that the transmitting mode FIGURES is assigned a transmitting code "0" and correspondingly in the LETTERS mode, the transmitting code M FIGS is "1".

Assuming that a transition from the FIGURES mode to the LETTERS mode occurs, the three transmitting mode control signals have the conditions "M FIGS"=0, "FIGS"=0 and "LETS"=1. Pl The control signals FIGS and LETS determine a high output condition of the inverter 923 and the NAND gate 928 furnishes a low level output signal, accordingly. The NAND GATE 927 primed by the negative transition signal FL generates a high level output signal and the output of the negative OR gate 926 is high. This results in a high output signal of the output driver 924 and a "1" is stored in the 7th bit of the currently selected memory location of the sequence count RAM 306. Correspondingly, it can be easily derived that the opposite applies when a transition from the LETTERS mode to the FIGURES mode occurs.

The normal case is that no transition is recognized which is accompanied by a high level of the negative transition signal $\overline{\text{FL}}$. Accordingly, the NAND gate 927 is enabled to pass the unaltered previous transmitting code signal M FIGS onto the output driver 924.

In any case of a transition from one transmitting mode to the other, the new transmitting code is also to be stored in the sequence count memory location which is associated with the cross-connected line terminator.

This second write operation demands for extending the scan operation. This is achieved by means of a further control flip-flop 929 which receives at its inputs $\bar{J}$ and $\bar{K}$ the positive transition signal FL as a priming signal. The flip-flop is triggered by the mentioned shift check signal SHFT CHK.

Whenever the control flip-flop 929 is set a shift signal SHIFT is generated at its positive output Q indicating that an extended write cycle is demanded. The shift signal is applied to the READ/WRITE control unit, yet to be described in detail. The generation of the shift signal is inhibited when the communications controller is in the initialization mode represented by the negative initialization signal $\overline{\text{CM CLR}}$ and when an extended write cycle has taken place already. This condition is represented by the cross-connection control signal $\bar{X}$ OVER. Each control signal is applied to a respective input of a further negative NOR gate 930 which is connected to a direct clear input of the control flip-flop 929.

Figure 10:
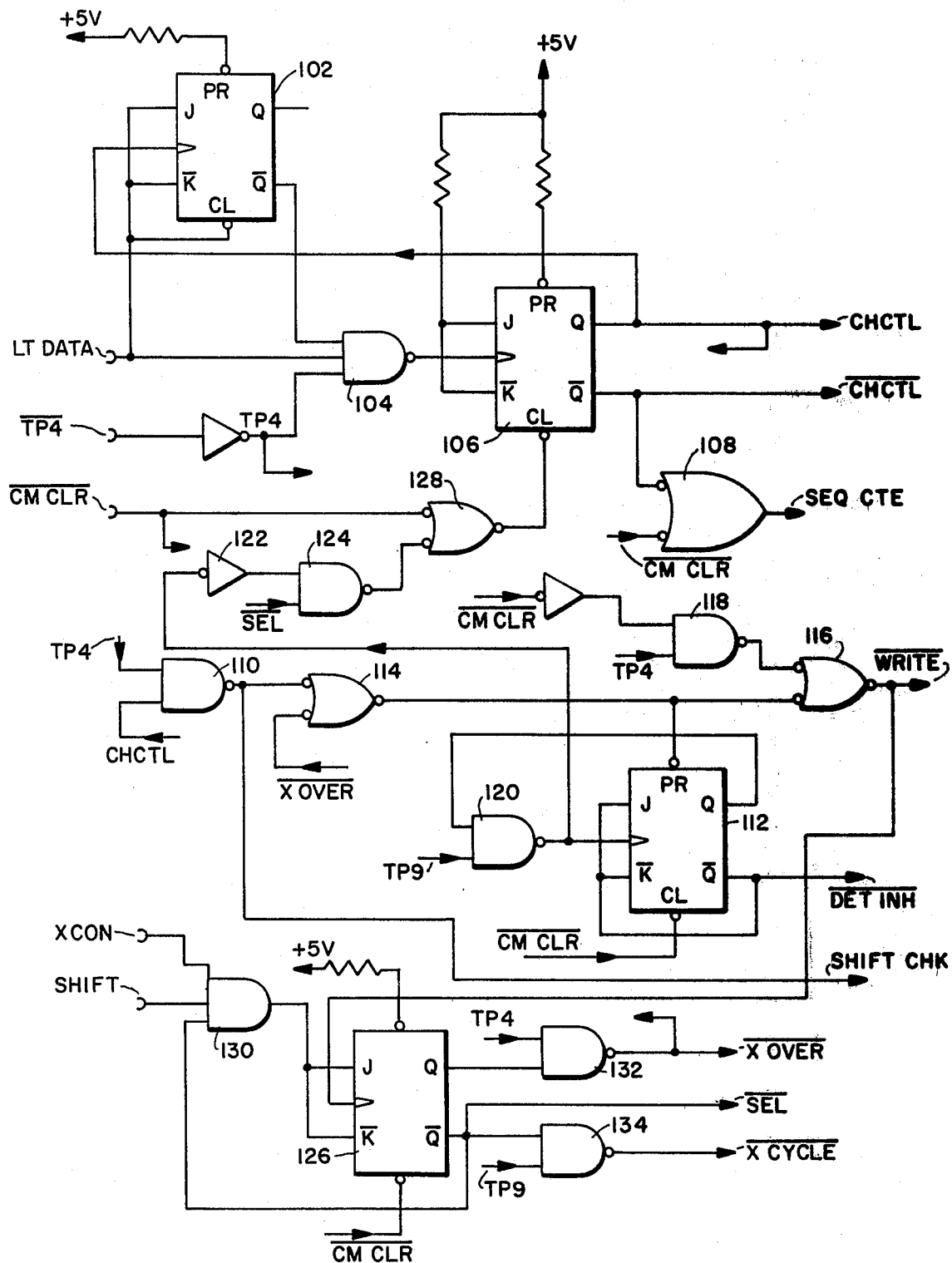
FIG. 10 shows a block diagram of still another control unit of the detection circuit arrangement the read/write control unit represented in FIG. 3.
Figure 11:
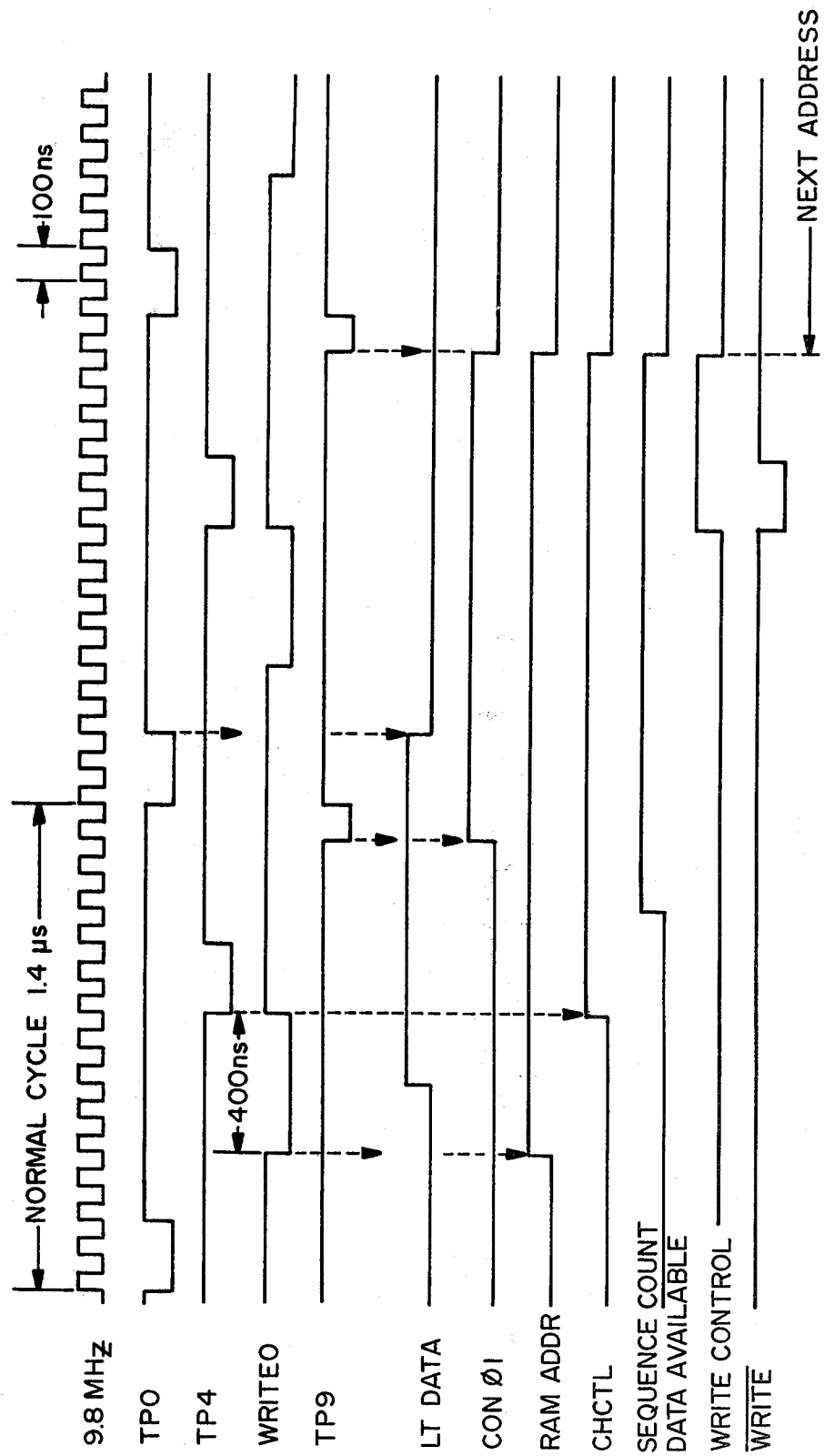
FIGS. 11 and 12 show wave forms of various control signals representing in combination the timely operation of the special character circuit arrangement with respect to recognizing and evaluating a special character and a transfer mode character, respectively.
Figure 12:
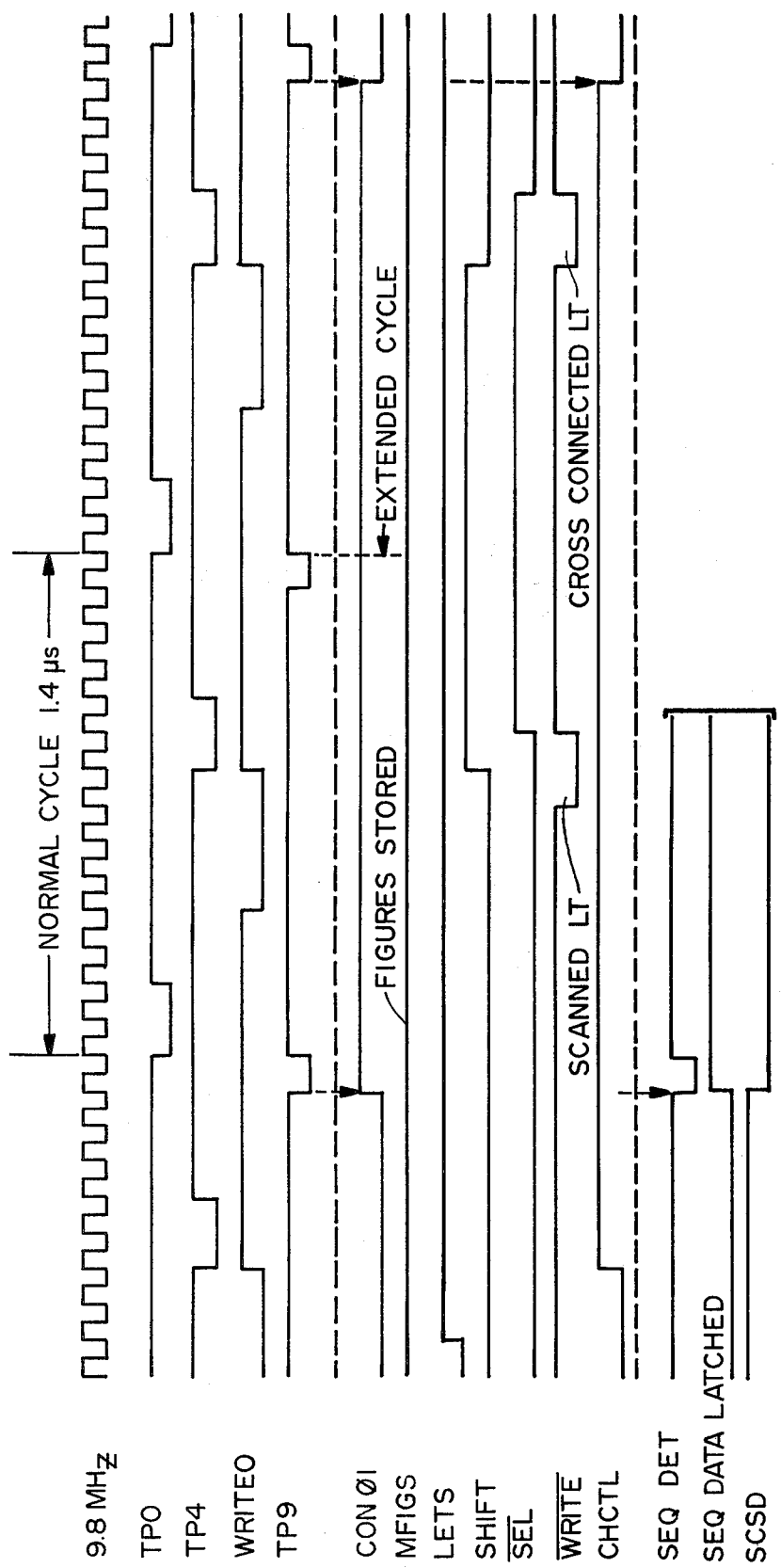

Read/Write Control Unit (FIGS. 10 to 12)

The read/write control unit will now be described in more detail with reference FIGS. 10–12. FIG. 10 shows a block diagram of this control section of the circuit arrangement according to the present invention and FIGS. 11 and 12 represent timing diagrams illustrating timing pulses derived from a master clock of 9.8 MHz. Only several ones of the derived timing pulses, such as TP0, TP4 and TP9, are of concern here. Other timing pulses are omitted for simplicity.

The special character sequence detection circuit arrangement is activated by the described data status signal LT DATA generated by the data interface control unit (FIG. 2) and being present whenever a scanned line terminator sends data information. This control signal is commonly applied to a direct reset input CL and data inputs J and $\bar{K}$ of a further control flip-flop 102 and to a first input of a further NAND gate 104. A second input of this NAND gate is connected to a negative output $\bar{Q}$ of the control flip-flop 102. The leading positive edge of the data status signal LT DATA resets the control flip-flop 102. Accordingly, the signal at the negative output $\bar{Q}$ is high. This enables the NAND gate 104 when it receives the timing pulse TP4 at its third input. The purpose of the control flip-flop 102 is to allow just one pulse to be generated by the NAND gate 104 because the data status signal LT DATA may be high for more than one operation cycle.

The output signal of the enabled NAND gate 104 sets a further flip-flop 106 having a positive output Q connected to the clock input of the control flip-flop 102. When the control flip-flop 106 is set it generates a control signal which triggers the control flip-flop 102 and consequently inhibits the NAND gate 104 until the control flip-flop 102 is reset by the data status signal LT DATA going low.

The setting of the control flip-flop 106 generates the "character to latch" control signal CHCTL for controlling the operations of the sequence count RAM 306, of the RAM buffer register 310 and of the sequence detect PROM 304 (FIGS. 3 and 5).The positive edge of the latch signal CHCTL strobes the data bus 316 to load the RAM buffer register 310. This is accomplished by furnishing this latch control signal CHCTL to the enable input of the RAM buffer register. The latched data is the data which is read out from the sequence count RAM 306 at the current scan address. The output data of the RAM buffer register 310 is presented to the sequence detect PROM 304 in combination with the output data from the character detect PROM 302, as previously described. The data stored at the selected PROM location is made available to the decision logic by the negative latch control signal $\overline{\text{CHCTL}}$ which is applied to an enabling input of the sequence detect PROM 304.

The output data of the sequence detect PROM 304 has to be written back into the sequence count RAM 306 if the gating logic 314 allows feedback. The write operation into the sequence count RAM is controlled by a sequence count enable signal SEQ CTE and a $\overline{\text{WRITE}}$ pulse. The former signal is derived from a further negative OR gate 108 connected by one input to the negative output $\bar{Q}$ of the control flip-flop 106 and receiving at a second input the negative initialization control signal $\overline{\text{CM CLR}}$.

For generating the $\overline{\text{WRITE}}$ pulse, there is provided a further NAND gate 110 receiving at its inputs the fourth timing pulse TP4 and the positive latch control signal CHCTL, respectively. The output signal of the enabled NAND gate 110 sets a further control flip-flop 112 through a further negative NAND gae 114 which also receives the cross-connection control signal $\bar{X}$ OVER controlling an extended write cycle when a FIGURES/LETTERS transition has been detected, as will be described later in more detail. The $\overline{\text{WRITE}}$ pulse is made available at the write enable input of the sequence count RAM 306 through a further negativ NOR gate 116. Obviously, a $\overline{\text{WRITE}}$ pulse can also be generated during initialization mode by means of an output signal of a further NAND gate 118 which is enabled by the fourth timing pulse TP4 applied to one input, if at a second input the positive initialization signal CM CLR is present.

The purpose of the previously mentioned control flip-flop 112 is to insure that only one $\overline{\text{WRITE}}$ pulse is generated. This is accomplished by a controlled reset of the control flip-flop 106. A third control flip-flop 112 generates at its positive output Q a write control signal when preset by the write pulse. This write control signal is applied to one input of a further NAND gate 120 which receives at a second input the timing pulse TP9. This timing pulse enables the NAND gate 120 in the preset condition of the control flip-flop 112 and triggers a reset of the flip-flop determined by the low signal generated at its negative output $\bar{Q}$ and applied to the data inputs J and $\bar{K}$.

The output signal of the NAND gate 120 furthermore is inverted by an inverter 122 and is applied to a first input of a further NAND gate 124. This NAND gate receives at a second input the negative select control signal $\overline{\text{SEL}}$ generated by a further control flip-flop 126 which controls an extended WRITE cycle after a transition of the FIGURES or LETTERS mode, as will be described later in more detail. The output of the NAND gate 124 is connected to the clear input of the control flip-flop 106 through a further negative NOR gate 128 which receives the negative initialization control signal $\overline{\text{CM CLR}}$ at a further input. A reset of the control flip-flop 106 is inhibited by means of the select control signal $\overline{\text{SEL}}$ applied to the NAND gate 124 which results in an extra operation cycle, when a transition of the transmitting mode from FIGURES to LETTERS or vice versa has been recognized.

This specialty will now be considered in more detail. With reference to the transition control unit 320, shown in FIG. 9, it has been pointed out that a recognized transition from one transmitting mode to the other demands the new transmitting mode code to be written into the sequence count RAM twice which requires an extended write cycle. For initiating the extended write cycle, if applicable, the output signal of the NAND gate 110 genertring the $\overline{\text{WRITE}}$ pulse for the sequence count RAM 306 is also applied to the transition control unit 320. This signal here is designated as shift check signal SHFT CHK illustrating its purpose to check if a shift from one transmitting mode to another has occurred. This signal sets the control flip-flop 929 of the transition control unit (FIG. 9) when a transition has been detected and triggers the shift signal SHIFT to be generated.

This shift signal SHIFT is applied to one input of a further AND gate 130 of the READ/WRITE control unit represented in FIG. 10. This AND gate receives at a further input the mentioned monitor control signal XCON which is one of the output signals of the data interface control unit represented in FIG. 2. This monitor control signal designates the cross-connected mode of the communications controller and enables the AND gate 130 when its third input connected to the negative output $\overline{Q}$ of the control flip-flop 126 is high, that is, the flip-flop is reset. The enabled AND gate 130 applies high signals to the flip-flop inputs J and $\overline{K}$. The flip-flop is triggered by the $\overline{\text{WRITE}}$ pulse, that is the flip-flop 126 is set at the beginning of the first write operation into the sequence count RAM 306. At this time the transmitting mode code generated at the data output of the transition control unit 320 (FIG. 9) is loaded onto the data bus 316 for being stored at the memory location assigned to the currently scanned line terminator. When the control flip-flop 126 is set a further NAND gate 132 connected by one input to the positive output Q of the control flip-flop 126 is enabled by the fourth timing pulse TP4. The corresponding output signal is the previously mentioned cross-connection control signal $\overline{\text{X}}$ $\overline{\text{OVER}}$ which triggers the negative NOR gate 114. At the negative output $\overline{Q}$ of the control flip-flop 126, the negative select control signal $\overline{\text{SEL}}$ is present which serves two purposes.

It inhibits the AND gate 124 to generate an output signal for resetting the control flip-flop 106, as described, and it is carried to the selector input of the address multiplexor 514 (FIG. 5) for initiating the selection of the second set of the multiplexor inputs which are connected to receive a line terminator number of the cross-connected line terminator from the connection memory 16.

A further NAND gate 134 is connected by one input to the negative output $\overline{Q}$ of the control flip-flop 126. This NAND gate is strobed by the timing pulse TP9 to generate a control signal for a cross-connect cycle $\overline{\text{X}}$ $\overline{\text{CYCLE}}$ which is applied to the clock input of the first connect flip-flop 206 (FIG. 2) which generates the connect control signal CON 1. This connect control signal finally inhibits the counter of the scanner and maintains the current scan address for a write cycle, in this case, the extended write cycle to write information into the memory location assigned to the cross-connected line terminator.

The course of a scan operator can be recognized by the timing diagrams shown in FIGS. 11 and 12. In light of the description above, the wave forms represented are self-explanatory. In summary, both figures illustrate the master clock pulse train of 9.8 MHz, derived timing pulses TP0, TP4, TP9 and the write status signal WRITE 0 in the top parts.

The bottom part of FIG. 11 shows the wave forms of the major control signals providing the timing of the normal operation of the special character sequence detection circuit arrangement during a scan operation.

FIG. 12 represents in the center part a group of wave forms controlling the operation when a transition of the transmitting mode has been recognized and an extended write cycle is triggered by the shift signal SHIFT. The wave forms shown in the bottom part of FIG. 12 illustrate the timing for a sequence detection. The special character sequence detected control signal SCSD shown in the last line represents the signal triggering the DMA transfer of the data stored in the output register 916 of the sequence detector and buffer unit 322 (FIG. 9) and stays low until the next write status signal WRITE O occurs after the DMA transfer has taken place. This condition can last from 5 to 64 μs.

There has thus been shown and described a novel special character sequence detection circuit arrangement which fulfills all the objects and advantages sought therefore. Many changes, modifications, variations and other uses and applications of the subject invention will, however, become apparent to those skilled in the art after considering the specification and the accompanying drawings, which disclose a preferred embodiment thereof. All such changes, modifications, variations and other uses and applications which do not depart from the spirit and scope of the invention are deemed to be covered by the invention which is limited only by the claims which follow.

What is claimed is:

1. A special character sequence detection circuit arrangement for use with a central exchange of a time multiplex digital telecommunications system, said central exchange having line terminators each adapted to be connected to a respective data terminal and central data transfer control means including central timer means for generating central timing pulses, storage means for storing cross-connect control information, selecting means for generating address signals in the form of line terminator numbers each activating a respective line terminator to send a data character, and data interface means for establishing temporary data links between line terminators, wherein an established set of data characters includes special characters which, when sent out repetitively by the same line terminator during subsequent scan cycles and a predetermined number of times are recognized and evaluated for triggering a corresponding control process, said special character sequence detection circuit arrangement comprising:
    (a) a random access memory having address inputs, data inputs, data outputs and memory locations each associated with a respective one of the line terminators, said address inputs connected to receive the currently generated line terminator number and said memory locations containing both a previous character code specifying the previously transmitted data character and a previous count designating the number of times the specified data character was previously sent;
    (b) a first read-only memory having address inputs connected to receive a currently transmitted data character, having memory locations programmed to assign an individual character code to each special character and a common non-special character code to non-special characters, respectively, and having data outputs furnishing this current character code;

(c) a second read-only memory connected to receive at address inputs the current character code from the first read-only memory, and both the previous character code and the previous count number from the random access memory, having memory locations programmed to derive from the received address information output signals representing in combination the current character code and an incremented count number both furnished at data outputs to be stored in the random access memory at the currently selected memory location and programmed to generate in dependence upon a maximum count a detection control signal representing the status of a detected special character sequence.

2. The special character sequence detection circuit arrangement as recited in claim 1, further comprising an input buffer connected to receive a transmitted data character for intermediately storing the same prior to an evaluation by the first read-only memory.

3. The special character sequence detection circuit arrangement as recited in claim 1, the random access memory further comprising:
- an array of memory components each having address inputs, bidirectional data input/output ports, a chip enable input, a write enable input and an output enable input.
- an address bus formed of a plurality of address lines each commonly connected to a respective one of the address inputs of the memory components;
- memory address selecting means having inputs connected to receive a random access memory address in form of a line terminator number, having address outputs each connected to a respective one of the address bus lines, having select control outputs each connected to a respective one of the chip enable inputs and being designed to derive respective chip enable signals from the combination of the most significant bits of the present line terminator number.

4. The special character sequence detection circuit arrangement as recited in claim 3, further comprising:
- a bidirectional data bus formed of a plurality of data bus lines arranged in two groups designed and connected to transmit the character code and the count number, respectively, to and from the random access memory;
- a memory buffer register having inputs each connected to a respective one of the data bus lines for receiving output data from the random access memory and having data outputs connected to respective one of the address inputs of the second read only memory for furnishing thereto both the previous character code and the previous count number; and
- a read/write control unit, connected to receive selected ones of the central timing pulses, for generating data bus control signals in the form of data input/output enabling signals for the devices connected to the data bus.

5. The special sequence detection circuit arrangement as recited in claim 4, wherein the read/write control unit comprises:
- a first control flip-flop primed to be set by means of a first trigger pulse derived from a first timing pulse when occurring in combination with a character control signal being present when the presently selected line terminator is sending a data character, said control flip-flop having a clear input and an output carrying a latch control signal for enabling the memory buffer register, the second read only memory and subsequently the gating logic unit when a data character is received;
- a first logical gate having inputs connected to receive the latch control signal and the first timing pulse and being designed for generating a write pulse enabling the random access memory to be written into upon the second occurrence of the first timing pulse as long as the latch control signal is present; and
- a second control flip-flop having a preset input connected to receive the write pulse for being preset upon the occurrence of the write pulse, and designed for being reset thereafter upon occurrence of a second trigger pulse derived from a second timing pulse following the first timing pulse; wherein the clear input of the first control flip-flop is connected to receive said second trigger pulses for resetting the first control flip-flop.

6. The special character sequence detection circuit arrangement as recited in claim 5 and designed for operating at different modes of operation regarding the quantity of recognizable special characters, on the one hand, and the number of characters determining a complete sequence, on the other hand, further comprising:
- a mode control unit including switch means individually to be preset for selecting a full and a limited set of special characters, respectively, in combination with a respective one of the special character numbers and for generating correspondingly a character mode control signal and a number mode control signal;
- a sequence detecting and buffering unit including means for evaluating the observed count in comparison with the character mode control signal for generating a sequence detection signal when the current count corresponds to the selected number of characters, and including an output buffer register connected to latch the current output code when enabled by means of the sequence detection signal for triggering a corresponding control process of the central exchange; and
- a gating control unit arranged between the output side of the second read only memory and the data bus and connected to receive the sequence detection signal for inhibiting the transfer of the current code to the random access memory when the sequence detection signal is present.

7. The special character sequence detection circuit arrangement as recited in claim 6, wherein the switch means of the mode control unit further comprise:
- a first and a second switch circuit for providing said frequency mode control signal and said character mode control signal, respectively,
- wherein each switch circuit includes a resistor and a switch connected to each other across a connector tap and being arranged in series between positive supply voltage and ground, and encloses an inverter having an input connected to said connector tab and an output, and
- said connector tap and said inverter output form two outputs of the switch circuits each output supplying the respective control signal in normal and in inverted form, respectively.

8. The special character sequence detection circuit arrangement as recited in claim 6, the gating logic unit further comprising:
- a group of tri-state gates each formed of a control AND gate, having two inputs and an output, and of a driver stage having an input connected to the output of the respective control AND gate,
- an enabling input connected to receive the latch control signal and an output connected to a corresponding one of the multiple lines of the data bus,
- wherein, one output of each control AND gate is connected to receive a corresponding one of the output signals of the second read-only memory representing in combination the current output code, and the second inputs of the control AND gates are commonly connected to receive the sequence detection signal in inverted form for inhibiting the tri-state gates upon detection of a complete sequence.

9. The special character sequence detection circuit arrangement as recited in claim 8, wherein the gating control unit comprises further driver stages, each associated with a respective one of the multiple lines of the data bus and having a data input connected to ground, an output connected to the corresponding data bus line and an enabling input connected to receive an initialization control signal being present during an initialization mode for loading zeros into the random access memory locations.

10. The special character sequence detection circuit arrangement as recited in claim 6, designed to evaluate an established set of special characters including two transfer mode characters each specifying a figures or letters transfer to be assumed by the currently transmitting data terminal, wherein said memory locations of both the random access memory and the first read-only memory further comprise storage elements for storing transfer mode code signals each designating a respective one of the figures and the letters transfer mode of the associated line terminator, and wherein the read-only memory includes two further memory locations being selectable by means of a respective one of the transfer mode characters and being designed such that the storage elements designating the character code are set to the non-special character code thereby indicating that the respective special character is not associated with a special character sequence.

11. The special character sequence detection circuit arrangement as recited in claim 10, further comprising a transition control unit connected to receive the transfer mode code signals from the first read-only memory and the corresponding previous control transfer mode code signal read out from the random access memory buffer and being designed to recognize a change from one transfer mode to the other, and to generate subsequently a transfer mode control signal and a new transfer mode code signal to be stored at the currently selected memory location of the random access memory.

12. The special character sequence detection circuit arrangement as recited in claim 11, wherein the transition control unit further comprises:
- a detection logic circuit having two signal inputs each connected to receive a respective one of the current transfer mode code signals from the first read only memory, a control input connected to receive the character mode control signal for enabling the detection logic circuit if the selected set of special characters includes the transfer mode characters, and an output carrying the transfer mode control signal when a transfer mode character is recognized; and
- an evaluation logic circuit designed for generating the new transfer mode code signal and having an enabling control input connected to receive the transfer mode control signal, a first signal input connected to receive one of the transfer mode code signals generated by the first read only memory, a second signal input connected to receive the previous transfer mode code signal read out from the random access memory and a signal output, wherein said evaluation logic circuit is designed such that the previous transfer mode code signal is reconstructed in dependence upon the signal condition being present at its first signal input, and the reconstructed signal representing the current transfer mode code signal occurs at the signal output of the evaluation logic unit; and
- an output driver stage having an input connected to the output of the evaluation circuit, an output connected to a multiple line of the data bus associated with the transfer mode code.

13. The special character sequence detection circuit arrangement as recited in claim 12, wherein upon detection of a respective one of the transfer mode characters and any character other than a special character of the selected set of special characters a currently observed special character sequence is aborted and wherein the mode control unit further comprises:
- a logic network including an AND gate and an OR gate each having a first and second input and an output, the first input of the AND gate being connected to receive the character mode control signal, the second input of the AND gate being connected to receive a code character control signal specifying the currently observed special character whether the same is assigned to the extended set of special characters and being derived from the output character code currently present at respective outputs of the second read only memory, and the output of the AND gate being connected to the first input of the OR gate receiving at its second input the transfer mode control signal and generating at its inverted output a shift control signal for inhibiting the transfer of the output character code from the second read only memory onto the data bus if a transfer mode character or a special character, other than the special characters of the selected set of special characters has been recognized.

14. The special character sequence detection circuit arrangement as recited in claim 13, further comprising an address selector device having outputs connected to the address inputs of the random access memory and two sets of selector imputs, a first set of said selector inputs connected to receive said address signals designating the currently scanned line terminator and a second set of said selector inputs connected to receive the number of the corresponding cross-connected line terminator from said storage means for selecting the random access memory location associated with the cross-connected line terminator and storing therein the currently present transfer mode code signal whereby the transfer mode of both line terminators currently communicating with each other is synchronized.

15. The special character sequence detection circuit arrangement as recited in claim 1, the second read-only memory comprising:

n+1 memory sections, each comprised of n+1 memory sub-areas each including m consecutive memory locations, wherein n equals the number of characters of the established set of special characters and m equals the established maximum frequency necessary to determine a completed sequence;

a group of most significant address inputs connected to receive in common the previous character code for selecting one of said memory sections;

a group of less significant address inputs connected to receive the current character code for selecting a memory sub-area within a memory section;

a group of least significant address inputs connected to receive the previous count number for determining a memory location within a memory sub-area;

said memory locations each providing respective fields for the associated current character code, a count number and a sequence detected control signal element and being programmed such that the memory locations associated with diverse previous and current character codes contain said minimum count number in combination with the sequence detected signal in "off" condition, thereby indicating a presumed start of a new sequence and memory locations associated with identical previous and current character codes contain a count number incremented by one compared to the previous count number up to a maximum count number, and wherein the maximum count number has a bit pattern identical with the minimum count number but occurring in combination with the sequence detected signal in the "on" condition representing in combination a detected sequence.

* * * * *